United States Patent
Haslam et al.

(10) Patent No.: US 12,175,315 B2
(45) Date of Patent: Dec. 24, 2024

(54) FLEXIBLE RADIO BEACONS AND FLEXIBLE DELIVERY STRUCTURES AND SYSTEM AND METHOD FOR USING

(71) Applicant: Apptricity Corporation, Irving, TX (US)

(72) Inventors: Michael E. Haslam, Arlington, TX (US); Salman Farooqui, Fort Worth, TX (US); Tim Garcia, Colleyville, TX (US)

(73) Assignee: Apptricity Corporation, Irving, TX (US)

( * ) Notice: Subject to any disclaimer, the term of this patent is extended or adjusted under 35 U.S.C. 154(b) by 0 days.

(21) Appl. No.: 18/429,998

(22) Filed: Feb. 1, 2024

(65) Prior Publication Data

US 2024/0169176 A1    May 23, 2024

Related U.S. Application Data

(63) Continuation of application No. 17/634,057, filed as application No. PCT/US2020/056437 on Oct. 20, 2020, now Pat. No. 11,915,081.

(Continued)

(51) Int. Cl.
| | | |
|---|---|---|
| *G06K 19/07* | (2006.01) | |
| *G06K 19/02* | (2006.01) | |
| *H01Q 1/22* | (2006.01) | |

(52) U.S. Cl.
CPC ....... *G06K 19/0723* (2013.01); *G06K 19/025* (2013.01); *H01Q 1/2208* (2013.01)

(58) Field of Classification Search
CPC .................................................. G06K 19/0723

(Continued)

(56) References Cited

U.S. PATENT DOCUMENTS

| | | |
|---|---|---|
| 5,633,875 A | 5/1997 | Hershey et al. |
| 6,249,227 B1 | 6/2001 | Brady et al. |

(Continued)

FOREIGN PATENT DOCUMENTS

| | | |
|---|---|---|
| CA | 2985243 | 2/2017 |
| EP | 1188115 B1 | 8/2006 |

(Continued)

OTHER PUBLICATIONS

International Searching Authority: Notification of Transmittal of International Search Report, Written Opinion of Int'l Searching Authority, or the Declaration dated Feb. 18, 2021.

(Continued)

*Primary Examiner* — Rafferty D Kelly
(74) *Attorney, Agent, or Firm* — Hemingway & Hansen LLP; D. Scott Hemingway; Elizabeth P. Hartman

(57) ABSTRACT

Disclosed herein are Flexible Radio Beacons and Flexible Delivery Structures for asset and inventory identification and management. The Flexible Radio Beacon is dormant until activated at time of use. The Flexible Radio Beacon has optional activation means and can be activated physically or electronically. The Flexible Radio Beacon and Flexible Delivery Structures make a flexible radio frequency (RF) tag useful for asset tracking. Disclosed herein is a method for using Flexible Radio Beacons and Flexible Delivery Structures in flexible RF tags for asset and inventory identification and management. Disclosed herein is a system for asset and inventory identification and management using Flexible Radio Beacons and Flexible Delivery Structures in flexible RF tags.

23 Claims, 12 Drawing Sheets

Related U.S. Application Data

(60) Provisional application No. 63/006,586, filed on Apr. 7, 2020.

(58) Field of Classification Search
USPC .......................................................... 235/492
See application file for complete search history.

(56) References Cited

U.S. PATENT DOCUMENTS

| | | | |
|---|---|---|---|
| 6,687,609 | B2 | 2/2004 | Hsiao et al. |
| 6,977,612 | B1 | 12/2005 | Bennett |
| 7,072,668 | B2 | 7/2006 | Chow |
| 7,099,770 | B2 | 8/2006 | Naden et al. |
| 7,518,502 | B2 | 4/2009 | Austin et al. |
| 7,895,131 | B2 | 2/2011 | Kraft |
| 7,928,844 | B2 | 4/2011 | Mackenzie et al. |
| 8,223,009 | B2 | 7/2012 | Anderson et al. |
| 8,239,251 | B2 | 8/2012 | Wellman |
| 8,339,251 | B2 | 12/2012 | Roberts, Sr. et al. |
| 8,890,683 | B2 | 11/2014 | Schnitz et al. |
| 9,082,102 | B2 | 7/2015 | Taylor et al. |
| 9,111,433 | B2 | 8/2015 | Curatolo et al. |
| 9,362,630 | B2 | 6/2016 | Goswani |
| 9,456,302 | B2 | 9/2016 | Skomra et al. |
| 9,519,921 | B2 | 12/2016 | Wei et al. |
| 9,591,441 | B2 | 3/2017 | Kuhl et al. |
| 9,633,576 | B2 | 4/2017 | Reed |
| 9,635,518 | B2 | 4/2017 | Lee et al. |
| 9,641,964 | B2 | 5/2017 | Kulkarni et al. |
| 9,723,552 | B2 | 8/2017 | Farley et al. |
| 9,756,684 | B2 | 9/2017 | Tammisetti |
| 2006/0187026 | A1 | 8/2006 | Kochis |
| 2007/0046467 | A1 | 3/2007 | Chakraborty et al. |
| 2010/0228585 | A1 | 9/2010 | Bradley |
| 2011/0282235 | A1 | 11/2011 | Barwin |
| 2012/0070158 | A1* | 3/2012 | Allee ................... G06K 19/027 |
| | | | 375/259 |
| 2012/0127976 | A1 | 5/2012 | Lin et al. |
| 2013/0060351 | A1 | 3/2013 | Imming et al. |
| 2014/0291405 | A1 | 10/2014 | Harkes |
| 2016/0379165 | A1 | 12/2016 | Moakley |
| 2017/0031840 | A1 | 2/2017 | Cawse et al. |
| 2017/0083857 | A1 | 3/2017 | Barton |
| 2017/0123285 | A1 | 5/2017 | Hamilton |
| 2017/0208426 | A1 | 7/2017 | Komoni et al. |
| 2018/0176723 | A1 | 6/2018 | Klimek |
| 2018/0317049 | A1 | 11/2018 | Rittman |
| 2019/0304278 | A1 | 10/2019 | Lu |
| 2019/0362215 | A1 | 11/2019 | Khoche |

FOREIGN PATENT DOCUMENTS

| | | |
|---|---|---|
| JP | 2018-182514 | 11/2018 |
| KR | 1020170134016 | 12/2017 |

OTHER PUBLICATIONS

International Searching Authority: International Search Report dated Feb. 18, 2021.
International Searching Authority: Written Opinion of the International Searching Authority dated Feb. 18, 2021.
"The Internet of Things Architecture", I TU-T Draft: Study Period 2013-2016, International Communication Union, Geneva; CH, vol. m2m, Jun. 27, 2012, pf 1-144, XP044097902, para 3.1.3.1, 4.2.3, 4.2.6, 5.2.2, 5.3.3.1.

* cited by examiner

FLEXIBLE RADIO BEACONS AND FLEXIBLE DELIVERY STRUCTURES AND SYSTEM AND METHOD FOR USING

RELATED APPLICATION DATA

This application is a continuation of U.S. application Ser. No. 17/634,057, filed Feb. 9, 2022, which claims priority to PCT Patent Application No. PCT/US2020/056437, filed Oct. 20, 2020, and claims the benefit of U.S. Provisional Application No. 63/006,586, filed Apr. 7, 2020, which is incorporated by reference into this utility patent application.

TECHNICAL FIELD OF THE INVENTION

This invention relates to Flexible Radio Beacons and Flexible Delivery Structures for asset and inventory identification and management, and a method and system for using Flexible Radio Beacons and Flexible Delivery Structures for asset and inventory identification and management.

BACKGROUND OF THE INVENTION

Computers and computer networks have transformed the society and the work environment since their introduction in mass to the business community and the consuming public. The impact we see today on the way business is conducted and consumers interact with service providers and product retailers is rooted in the technological developments in the recent past.

Present-day Internet communications represent the synthesis of technical developments begun in the 1960s— the development of a system to support communications between different United States military computer networks, and the subsequent development of a system to support the communication between research computer networks at United States universities. These technological developments would subsequently revolutionize the world of computing.

The Internet, like so many other high-tech developments, grew from research originally performed by the United States Department of Defense. In the 1960s, Defense Department officials began to notice that the military was accumulating a large collection of computers—some of which were connected to large open computer networks and others that were connected to smaller closed computer networks. A network is a collection of computers or computer-like devices communicating across a common transmission medium. Computers on the Defense Department's open computer networks, however, could not communicate with the other military computers on the closed systems.

In the 1960s, the Defense Department developed a communication system that would permit communication between these different computer networks. The Defense Department recognized that developing a centralized communication system would be vulnerable to attacks or sabotage, so the Defense Department required that their new communication system be decentralized with no critical services concentrated in vulnerable failure points. In order to achieve this goal, the Defense Department established a decentralized communication protocol for communication between their computer networks.

A few years later, the National Science Foundation (NSF) established a communication system that facilitated communication between incompatible network computers at various research institutions across the country. The NSF adopted the Defense Department's protocol for communication, and this combination of research computer networks would eventually evolve into the Internet.

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. User Datagram Protocol (UDP) is a connectionless protocol that works like TCP without requiring the error-checking and recovery services required for TCP. UDP does not establish a connection before sending data and will continuously send datagrams to a recipient whether or not the datagrams are received. TCP is used in applications requiring high data reliability, such as World Wide Web (HTTPS), Secure Shell (SSH), File Transfer Protocol (FTP) and Email. UDP is used for applications requiring speed and efficiency, such as VPN tunneling, Domain Name Systems, Voice over IP, Trivial File Transfer Protocol (TFTP), live broadcasts, video streaming and games. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router, agent or gateway is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

The Internet protocols were originally developed with an assumption that Internet users would be connected to a single, fixed network. With the advent of cellular wireless communication systems, such as mobile communication devices, the movement of Internet users within a network and across network boundaries has become common. Mobile communications and cellular telephony systems have become smaller, lighter, and more powerful, which improved the ability to communicate with individuals on an exponential basis. Because of this highly mobile Internet usage, the implicit design assumption of the Internet protocols (e.g. a fixed user location) is violated by the mobility of the user. This violation led to the creation of mobile communication protocols that use a combination of digital and analog signals to send data for mobile devices.

The IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will normally be associated with a single Mobile Node home network for IP addressing purposes. The home network has a Home Agent and the foreign network has a Foreign Agent—both of which control the routing of information packets into and out of their network.

The Mobile Node usually keeps the Home Agent informed of its current location by registering a care-of address with the Home Agent, and a care-of address represents the current foreign network where the Mobile Node is located. If the Home Agent receives an information packet addressed to the Mobile Node while the Mobile Node is located on a foreign network, the Home Agent will "tunnel" the information packet to the Mobile Node's current location on the foreign network via the applicable care-of address. This tunneling is a type of communications protocol that facilitates movement of data between networks. The Foreign Agent may also participate in informing the Home Agent of the Mobile Node's current care-of address. The Foreign Agent can de-tunnel information packets for the mobile node after the information packets have been forwarded to the Foreign Agent by the Home Agent. Further, the Foreign Agent serves as a default router for out-going information packets generated by the mobile node while connected to the foreign network.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

In an IP-based mobile communications system, the Mobile Node changes its point of attachment to the network while maintaining network connectivity. Most Mobile IP Protocols used today assume that mobile IP communications with a Mobile Node will be performed on a single administrative domain or a single network controlled by one administrator. When a Mobile Node travels outside its home administrative domain, however, the Mobile Node must communicate through multiple domains in order to maintain network connectivity with its home network. While connected to a foreign network controlled by another administrative domain, network servers must authenticate, authorize and collect accounting information for services rendered to the Mobile Node.

Wireless communication systems could include multi-band radio architectures, systems capable of spectrum re-farming and software defined radio systems. Common system components in a wireless communication system, such as an IP-based mobile system, include at least one mobile node (or user equipment) and at least one access point AP or a base station on a wireless communication system. The various components on these systems may be called different names depending on the nomenclature used on any particular network configuration or communication system.

For the purposes of this application, the term "mobile node" refers to an Internet-connected device whose location or Internet attachment point may be changed frequently, and includes mobile communication units, mobile terminals, smart phones, transponders, beacons or nomadic devices, such as laptop PCs with wireless connectivity. A mobile node or user equipment also encompasses PCs having cabled (e.g., telephone line (twisted pair), Ethernet cable, optical cable, and so on) connectivity to the wireless network, as well as wireless connectivity directly to the cellular network, as can be experienced by various makes and models of mobile terminals (cell phones) having various features and functionality, such as Internet access, e-mail, messaging services, and the like.

Mobile nodes may sometimes be referred to as user equipment, mobile unit, mobile terminal, mobile device, or similar names depending on the nomenclature adopted by particular system providers. A receiver and transmitter is located at each access point (AP), base station, or mobile node. As such, terms such as transmitter or receiver in the present invention are not meant to be restrictively defined, but could include components on each mobile communication unit or transmission device located on the network.

Mobile communication systems have used radio frequency identification tags and devices to track and monitor vehicles and other items, and these systems and methods allow for the communication between a host computer and a plurality of transponders (or beacons) through one or more interrogator units, which are devices that request data from the transponders. Transponders or beacons are electronic devices that receive an interrogation (radio frequency signal) and transmit a signal in response to the received signal.

Asset and inventory identification can be accomplished with machine readable codes such as barcodes and Quick Response (QR) codes, or by using passive or active radio tags or labels. Barcodes use a series of variable width bars to represent data and are read by optical scanning by a barcode reader. QR tags are similar to barcodes but use a matrix of dots instead of bars to represent data. Both barcodes and QR codes have the disadvantage of needing a tagged object to be in direct line of sight with an optical reader and requiring each object to be read individually. Radio tags have the advantage of being readable over greater distances without requiring line of sight and allow for multiple objects to be scanned at once. Additionally, Radio tags can have read/write functionality, allowing changes to be made in the tag data, whereas barcodes and QR codes are read-only tags. These technologies have targeted use cases with limitations. It is desired to have a technology that brings all these together into an integrated system, allowing for the optimum use of each.

Radio tags can be passive or active. Passive radio tags, such as Radio-frequency identification (RFID), do not have an integrated battery and are powered by energy from radio waves from an RFID reader. Active radio tags or beacons are battery-powered and can be read at a greater range from a reader. Radio-frequency identification systems use tags, or labels, attached to the objects to be identified. Two-way radio transmitter-receivers called interrogators or readers send signals to the tags and read the responses.

When a radio transmitter is attached to a battery, the unit is either active and using battery power, in standby mode and using battery power, or completely dormant and not using battery power. When manufacturing an active radio beacon or tag for end use, it is desired to maintain maximum shelf life with the unit completely dormant until needed for use.

Moreover, several patents and patent publications also show traditional methods of using computer networks and mobile connectivity for fleet managements and tracking assets, such as the following: (1) US Patent Publication No. 20170208426 published Jul. 20, 2017 to Komoni et al.; (2) US Patent Publication No. 2017/0031840 published Feb. 2, 2017 to Cawse; (3) US Publication No. 2016/0379165 published Dec. 29, 2016 to Moakley; (4) US Publication No. 2010/0228585 published Sep. 9, 2010 to Bradley; (5) U.S. Pat. No. 9,756,684, issued Sep. 5, 2017 to Tammisetti; (6) U.S. Pat. No. 9,723,552, issued Aug. 1, 2017 to Farley; (7) U.S. Pat. No. 9,641,964 issued May 2, 2017 to Kulkarni et al.; (8) U.S. Pat. No. 9,635,518 issued Apr. 25, 2017 to Lee et al.; (9) U.S. Pat. No. 9,633,576 issued Apr. 25, 2017 to Reed; (10) U.S. Pat. No. 9,591,441 issued Mar. 3, 2017 to Kuhl; (11) U.S. Pat. No. 9,519,921 issued Dec. 13, 2016 to Wei et al.; (12) U.S. Pat. No. 9,456,302 issued Sep. 27, 2016 to Skomra et al.; (13) U.S. Pat. No. 9,111,433 issued on Aug. 18, 2015 to Curatolo; (14) U.S. Pat. No. 9,082,102 issued on Jul. 14, 2015 to Taylor et al.; (15) U.S. Pat. No. 8,890,683 issued Nov. 18, 2014 to Schnitz et al.; (16) U.S. Pat. No. 8,339,251 issued on Dec. 25, 2012 to Roberts Sr. et al.; (17) U.S. Pat. No. 8,239,251 issued Aug. 7, 2012 to Wellman; (18) U.S. Pat. No. 8,223,009 issued Jul. 17, 2012 to Anderson et al.; (19) U.S. Pat. No. 7,928,844 issued Apr. 19, 2011 to Mackenzie et al.; (20) U.S. Pat. No. 7,895,131 issued Feb. 22, 2011 to Kraft; (21) U.S. Pat. No. 7,518,502 issued Apr. 14, 2009 to Austin et al.; (22) U.S. Pat. No. 7,099,770 issued Aug. 29, 2006 to Naden et al.; (23) U.S. Pat. No. 7,072,668 issued Jul. 4, 2006 to Chow; (24) U.S. Pat. No. 6,977,612 issued Dec. 20, 2005 to Bennett; (25) U.S. Pat. No. 6,687,609 issued Feb. 3, 2004 to Hsiao et al.; (26) U.S. Pat. No. 6,249,227 issued Jun. 19, 2001 to Brady et al.; and (27) U.S. Pat. No. 5,633,875 issued May 27, 1995 to Hershey et al.

Prior art communication systems, including the above prior art methods and systems (including known radio frequency wireless communication systems and methods) are not optimized to adequately operate in the mobile environment with efficiency nor do they effectively and efficiently utilize the capabilities of the radio frequency wireless communication systems to communicate and track assets. There is no present system that satisfactorily correlates and associates various features and capabilities of the mobile communication system to provide fully integrated, asset tracking capabilities operable over multiple delivery mechanisms with integration into existing technologies for multiple use cases.

What is needed is a system that allows for the optimum use of asset tracking technologies, such as passive radio tags, active radio beacons, and machine-readable codes, while using minimal or no power prior to point of use, with optional means available for activation of the radio devices. Also needed is a system and method that optimizes asset tracking technologies into an integrated asset and inventory tracking system.

SUMMARY OF THE INVENTION

This invention represents a physically flexible, active radio beacon for tracking that optionally stays dormant until manually or automatically activated, and a system and method for utilizing the physically flexible, active radio beacon. This flexible, active radio beacon, also called a flexible tag, flexible delivery structure or Flex Tag, can be inserted into multiple delivery mechanisms that are made possible by the physical flexibility of the structure. The flexible unit is optionally encased in a moisture resistant coating that is also flexible. This flexible tag allows integration with existing technologies for multiple use cases.

The invention is a physically flexible, active radio beacon combined with one or more optional RFID tags in one unit. The RFID tags and the radio beacon may be optionally connected to communicate with each other and/or control each other. The power to the active radio beacon may optionally be provided by a battery, by the RFID tags, or by both.

A physically flexible, active radio beacon which includes one or more RFID tags connected to the beacon for data communications and optional power use and control is disclosed. This RFID tag can be encoded by external devices, and that encoding can be read by the active radio beacon and subsequently used in radio transmissions by the beacon. The encoding of or communicating with the RFID tag can be used to actuate or toggle the power of the tag from its initial manufactured power-off state, a powered-on state, or from a dormant low power state. The power can optionally be controlled by a physical switch or a combination of encoding actuation and a physical switch. The radio beacon can receive signals and use internal logic to program the RFID tag. The individual radio beacon and RFID tag may each have memory and logic for control. Memory may also be shared between the two units. A central control can optionally be introduced to communicate with and control one or both units.

Disclosed herein is a flexible radio frequency (RF) tag comprising a beacon layer with an integrated transmitter and power source having an active radio beacon constructed on a flexible printed circuit board. The radio beacon is configured to transmit radio frequency signals and the radio beacon remains dormant until activated. The radio beacon has data storage and programming capabilities after activation wherein encoding is reported to the tag for storage and broadcast.

The tag has one or more antenna for receiving and transmitting said radio frequency signals, a switch coupled to the radio beacon that is activated by an electronic signal and having a decoder that receives and decodes an activation signal, a battery attached adjacent to the flexible printed circuit board and coupled to the switch, the battery being the power source for the tag. The tag has a semi-flexible top layer printable with machine readable code, human readable text, or combinations thereof, the semi-flexible top layer being coupled to the beacon layer. The tag is configured to be in communication with one or more computing devices external to and in wireless communication with the tag for tracking an asset associated with the tag.

The tag further comprises one or more Radio Frequency Identification (RFID) tags connected adjacent to the flexible printed circuit board in the beacon layer. The integrated transmitter and power source in the beacon layer may be activated physically by physical pressing force from an automated device and the pressing force actuates the switch to activate the radio beacon. The battery and/or the integrated transmitter and power source in the beacon layer may be activated electronically by an encoding signal from an encoding device.

The disclosed tag further comprises a bottom layer underlying and affixed to the beacon layer, wherein the bottom layer provides protection, water resistance and/or adhesion for the tag. The tag further has one or more layers of surrounding material around one or more edges of the beacon layer, wherein the surrounding material provides support, protection and/or adhesion for the tag. The tag may be encased in a flexible moisture resistant coating or a non-flexible container.

An RFID identification is reportable through the radio beacon and a radio beacon identification is reportable through an RFID reader for the tag. Tracking, identification, and status data broadcast by the tag is stored in cloud storage. The radio beacon transmits and receives radio frequency signals, and the radio beacon uses standards-based radio frequency communication.

Also disclosed is a communication system supporting processing of communications between a physically flexible radio frequency (RF) tag and a home computer network for asset tracking, the system has a first computer server on a home network, the first computer server having one or more hardware data processors with functionality to receive and process tracking, identification and status information signals relating to one or more trackable assets. The first computer server is coupled to a first database for storing and maintaining information relating to the trackable assets, the first computer server being coupled to a home agent and a first gateway server for communication outside the home network.

The claimed communication has one or more flexible radio frequency (RF) tags associated with one or more trackable assets, the tag having a beacon layer with an integrated transmitter and a power source. The tag has an active radio beacon constructed on a flexible printed circuit board, configured to transmit radio frequency signals, with the radio beacon remaining dormant until activated. The radio beacon has data storage and programming capabilities after activation where encoding is reported to the tag for storage and broadcast. The tag has one or more antennas for receiving and transmitting radio frequency signals, a switch coupled to the radio beacon that is activated by an electronic signal and having a decoder that receives and decodes an activation signal, and a battery attached adjacent to the flexible printed circuit board and coupled to the switch, the battery being the power source for the tag.

The tag may have a pressure activation device that manually actuates the switch by application of a physical pressing force, a decoder that electronically actuates the switch by receipt of an external radio activation signal to one of said one or more antenna, or a combination thereof. The tag has one or more semi-flexible layers providing support, protection and/or adhesion affixed to a top surface, a bottom surface, or around one or more edges of the beacon layer, at least one of which is a semi-flexible top layer printable with machine readable code, human readable text, or combinations thereof. The semi-flexible top layer is affixed to the top surface of the beacon layer. The tag is configured to be in communication with one or more computing device external to and in wireless communication with the tag for tracking an asset associated with the tag. One or more of the tags further comprise one or more RFID tag connected adjacent to the active radio beacon.

The communication system has one or more radio frequency receiving devices having application programing to receive radio frequency signals from the tag. The radio frequency receiving device receives signals transmitted from the tag, and the radio frequency receiving device relays data received from the tag to the first computer server. The radio frequency receiving device may be a computer, tablet computer, pad computer, laptop computer, mobile phone, handheld mobile device, or a dedicated radio frequency receiving device. A base-station transceiver unit coupled to the home network receives transmissions from one or more of the tags.

The communication system further has a second computer server on a foreign network. The second computer server is coupled to the radio frequency receiving device, the radio frequency receiving device is coupled to a second gateway server for communication outside the foreign network, and the radio frequency receiving device receives radio signals transmitted from one or more tag. The one or more RF tags are associated with one or more of the trackable assets and the radio frequency receiving device uses the radio signals to transmit tracking, identification and status information signals that are communicated to the first computer server on the home network. The integrated transmitter and power source in the beacon layer may be activated physically by physical pressing force from the pressure activation device, electronically by the external radio activation signal received by one of the antennas, or electronically by an encoding signal from an RFID encoding device, such as an RFID printer. The RF tag transmission utilizes one or more wireless personal area network (WPAN), wireless local area network (WLAN) or wireless wide area network (WWAN) radio frequency communication standards at a physical layer.

Disclosed herein is a method of transmitting communications between a physically flexible radio frequency (RF) tag and a home computer network for asset tracking having the steps of providing a first computer server on a home network, the first computer server being coupled to a first database and a first gateway, and the first computer server having one or more hardware data processors, and providing one or more flexible radio frequency (RF) tag associated with one or more trackable asset.

The tag of the method has a beacon layer with an integrated transmitter and power source with an active radio beacon constructed on a flexible printed circuit board. The radio beacon is configured to transmit radio frequency signals, and the radio beacon remains dormant until activated. The radio beacon has data storage and programming capabilities after activation with encoding reported to the tag for storage and broadcast. The tag has one or more antennas for receiving and transmitting said radio frequency signals, a switch coupled to the radio beacon that is activated by an electronic signal and has a decoder that receives and decodes an activation signal, and a battery attached adjacent to the flexible printed circuit board and coupled to the switch, the battery being the power source for the tag. The tag may have a pressure activation device that manually actuates the switch by application of a physical pressing force, a decoder that electronically actuates the switch by receipt of an external radio activation signal to one of said one or more antenna, or a combination thereof. The tag has one or more semi-flexible layers providing support, protection and/or adhesion affixed to a top surface, a bottom surface, or around one or more edges of the beacon layer, at least one of which is a semi-flexible top layer printable with machine readable code, human readable text, or combinations thereof, with the semi-flexible top layer affixed to the top surface of said beacon layer. The tag is configured to be in communication with one or more computing device external to and in wireless communication with the tag for tracking an asset associated with the tag. One or more tags further comprises one or more RFID tags.

The method also has the steps of providing a radio frequency receiver device that has application programming to receive transmissions from the beacon, where the radio frequency receiving device is a computer, tablet computer, pad computer, laptop computer, mobile phone, handheld mobile device, or a dedicated radio frequency receiving device; receiving, by the radio frequency receiver device, radio frequency signals transmitted from the radio beacon; relaying transmissions received by the radio frequency receiver device to the first computer server; and storing received transmissions in the database.

The method further has the steps of providing a base-station transceiver unit coupled to the home network that can receive transmissions from the tags; and providing a second computer server on a foreign network. The second computer server is coupled to the radio frequency receiving device, and the radio frequency receiving device is coupled to a second gateway server for communication outside the foreign network, and the radio frequency receiving device receives radio signals transmitted from the tags. Each of the one or more tags is associated with one of the trackable assets and the radio frequency receiving device using the radio signal transmissions to transmit tracking, identification and status information signals that are communicated to the first computer server on the home network. The RF tag radio beacon transmission utilizes one or more wireless personal area network (WPAN), wireless local area network (WLAN) or wireless wide area network (WWAN) radio frequency communication standards at a physical layer.

Disclosed herein is a physically flexible radio frequency (RF) tag. The flexible radio frequency tag has a beacon layer with an integrated transmitter and power source and has an active radio beacon constructed on a flexible printed circuit board. The radio beacon is configured to transmit radio frequency signals, and the radio beacon remains dormant until activated. The flexible radio frequency tag has one or more antenna for receiving and transmitting the radio frequency signals and an actuatable switch coupled to the radio beacon that when actuated will activate the radio beacon. The flexible radio frequency tag has a battery that is flexible or semi-flexible attached adjacent the flexible printed circuit board and coupled to the switch. The battery remains dormant until activated by the switch, and the radio beacon and battery are an integrated transmitter and power source. A flexible top layer printable with machine readable code, human readable text, and combinations thereof, is affixed to the beacon layer. The flexible RF tag is configured to be in communication with one or more computing device external to and in wireless communication with the flexible RF tag for tracking an asset associated with the flexible RF tag. The flexible radio frequency tag may further include one or more Radio Frequency Identification (RFID) tag connected adjacent the flexible printed circuit board in the beacon layer.

The flexible printed circuit board of the flexible radio frequency tag may further include at least one of a pressure device that manually actuates the switch by physical pressing force from an automated device, and a decoder device that electronically actuates the switch by receipt of an external radio signal to one of the antennas. The integrated transmitter and power source in the beacon layer may be activated physically by physical pressing force from the automated device, where a pressing force actuates the switch to activate the radio beacon and the battery. The integrated transmitter and power source in the beacon layer may be activated electronically by an encoding signal from an RFID encoding device, such as an RFID printer.

The flexible radio frequency tag may include a bottom layer underlying and affixed to the beacon layer, where the bottom layer provides protection, water resistance and/or adhesion for the flexible RF tag, and the flexible radio frequency tag may also include one or more layer of surrounding material around one or more edge of the beacon layer, where the surrounding material provides support, protection and/or adhesion for the flexible RF tag. The RF tag may be encased in a flexible moisture-resistant coating or a non-flexible container.

The RFID identification can be reportable through the radio beacon and the radio beacon identification can be reportable through the RFID reader for the flexible radio frequency tag. The radio beacon of the flexible radio frequency tag may have data storage and programming capabilities, may transmit and receive radio frequency signals, and may use standards-based radio frequency communication, including one or more of Bluetooth, LoRa, Wireless USB, WiFi, Ultra-Wide Band (UWB), ZigBee, and Bluetooth Low Energy (BLE).

Also disclosed is a communication system supporting processing of communications between a physically flexible radio frequency (RF) tag and a home computer network for asset tracking. The communication system has a first computer server on a home network, and the first computer server has one or more hardware data processor with functionality to receive and process tracking, identification, and status information signals relating to one or more trackable assets. The first computer server is coupled to a first database for storing and maintaining information relating to field assets and the first computer server is coupled to a home agent and a first gateway server for communication outside the home network.

The communication system has one or more flexible radio frequency (RF) tag associated with one or more trackable asset. The flexible radio frequency (RF) tag has a beacon layer with an integrated transmitter and power source with an active radio beacon constructed on a flexible printed circuit board, where the radio beacon is configured to transmit radio frequency signals, and the radio beacon remains dormant until activated. The radio beacon layer has one or more antenna for receiving and transmitting radio frequency signals, an actuatable switch coupled to the radio beacon that when actuated will activate the radio beacon, and a battery that is flexible or semi-flexible attached adjacent the flexible printed circuit board and coupled to the switch. The battery remains dormant until activated by the switch, and the radio beacon and battery are the integrated transmitter and power source.

The flexible radio frequency (RF) tag of the communication system has a flexible printed circuit board having at least one of a pressure device that may manually actuate the switch by physical pressing force from an automated device, and a decoder device that may electronically actuate the switch by receipt of an external radio signal to one of said one or more antenna. The integrated transmitter and power source in the beacon layer may be activated physically by physical pressing force from the automated device, electronically activated by the external radio signal received by one or more antenna, or electronically by an encoding signal from an RFID encoding device, such as an RFID printer. The flexible radio frequency (RF) tag has one or more flexible layers providing support, protection and/or adhesion. Layers are affixed to the top surface, the bottom surface, or around one or more edges, of the beacon layer, at least one of which is a flexible top layer printable with machine readable code and/or human readable text, and the flexible top layer is affixed to the top surface of the beacon layer. The flexible RF tag is configured to be in communication with one or more computing device external to and in wireless communication with the flexible RF tag for tracking an asset associated with the flexible RF tag. The flexible radio frequency (RF) tag may further include one or more RFID tag connected adjacent the active radio beacon.

The communication system also has one or more radio frequency receiving device having application programing to receive radio frequency signals from the RF tag. The radio frequency receiving device receives signals transmitted from the RF tag, and the radio frequency receiving device relays data received from the RF tag to the first computer server. The radio frequency receiving device may be a computer, tablet computer, pad computer, laptop computer, mobile phone, handheld mobile device, or a dedicated radio frequency receiving device. The communication system may also have a base-station transceiver unit coupled to the home network that can receive transmissions from one or more RF tag.

The communication system may also have a second computer server on a foreign network that is coupled to the radio frequency receiving device, and the radio frequency receiving device can be coupled to a second gateway server for communication outside the foreign network. The radio frequency receiving device receives radio signals transmitted from one or more RF tag, each of the one or more RF tag may be associated with one or more trackable asset. The radio frequency receiving device uses said radio signals to transmit tracking, identification and status information signals that are communicated to the first computer server on the home network.

The RF tag transmission utilizes one or more wireless personal area network (WPAN), wireless local area network (WLAN) or wireless wide area network (WWAN) radio frequency communication standards at the physical layer. The communication standards may include one or more of Bluetooth, LoRa, Wireless USB, WiFi, UWB, ZigBee, and Bluetooth Low Energy (BLE).

Disclosed herein is also a method of transmitting communications between a physically flexible radio frequency (RF) tag and a home computer network for asset tracking with the steps of providing a first computer server on a home network coupled to a first database and a first gateway, where the first computer server has one or more hardware data processors; supporting communications to and from the home network using the first gateway server; providing one or more flexible radio frequency (RF) tag associated with one or more trackable asset, providing a radio frequency receiver device that has application programming to receive transmissions from the beacon, where the radio frequency receiving device is a computer, tablet computer, pad computer, laptop computer, mobile phone, handheld mobile device, or a dedicated radio frequency receiving device; receiving, by the radio frequency receiver device, radio frequency signals transmitted from the radio beacon; relaying transmissions received by the radio frequency receiver device to the first computer server, and storing received transmissions in the database.

The flexible radio frequency (RF) tag of the disclosed method has a beacon layer having an integrated transmitter and power source with an active radio beacon constructed on a flexible printed circuit board. The radio beacon is configured to transmit radio frequency signals, and remains dormant until activated. The beacon layer has one or more antenna for receiving and transmitting radio frequency signals, an actuatable switch coupled to the radio beacon that when actuated will activate the radio beacon; and a battery, which is flexible or semi-flexible, attached adjacent the flexible printed circuit board and coupled to the switch, and the battery remains dormant until activated by the switch. The radio beacon and the battery are the integrated transmitter and power source. The flexible RF tag is configured to be in communication with one or more computing device external to and in wireless communication with the flexible RF tag for tracking an asset associated with said flexible RF tag.

The flexible printed circuit board of the flexible RF tag has at least one of a pressure device that manually actuates the switch by physical pressing force from an automated device, and a decoder device that electronically actuates the switch by receipt of an external radio signal to one of said one or more antenna. The flexible printed circuit board may have one or more flexible layers. The layers may provide support, protection and/or adhesion, may be affixed to a top surface, a bottom surface, or around one or more edges, of the beacon layer. At least one layer is a flexible top layer that may be printable with machine readable code and/or human readable text, and the flexible top layer is affixed to the top surface of the beacon layer.

The method steps may also include providing for a base-station transceiver unit coupled to the home network that can receive transmissions from one or more RF tag. The method steps may further include providing for a second computer server on a foreign network that is coupled to the radio frequency receiving device, the radio frequency receiving device being coupled to a second gateway server for communication outside the foreign network and the radio frequency receiving device receiving radio signals transmitted from the RF tag. Each of the one or more RF tag may be associated with one or more trackable asset, and the radio frequency receiving device uses radio signal transmissions to transmit tracking, identification, and status information signals that are communicated to the first computer server on the home network.

The RF tag radio beacon transmission utilizes one or more wireless personal area network (WPAN), wireless local area network (WLAN) or wireless wide area network (WWAN) radio frequency communication standards at the physical layer. The communication standards include one or more of Bluetooth, LoRa, Wireless USB, WiFi, UWB, ZigBee, and Bluetooth Low Energy (BLE).

DETAILED DESCRIPTION

Figure 1A:
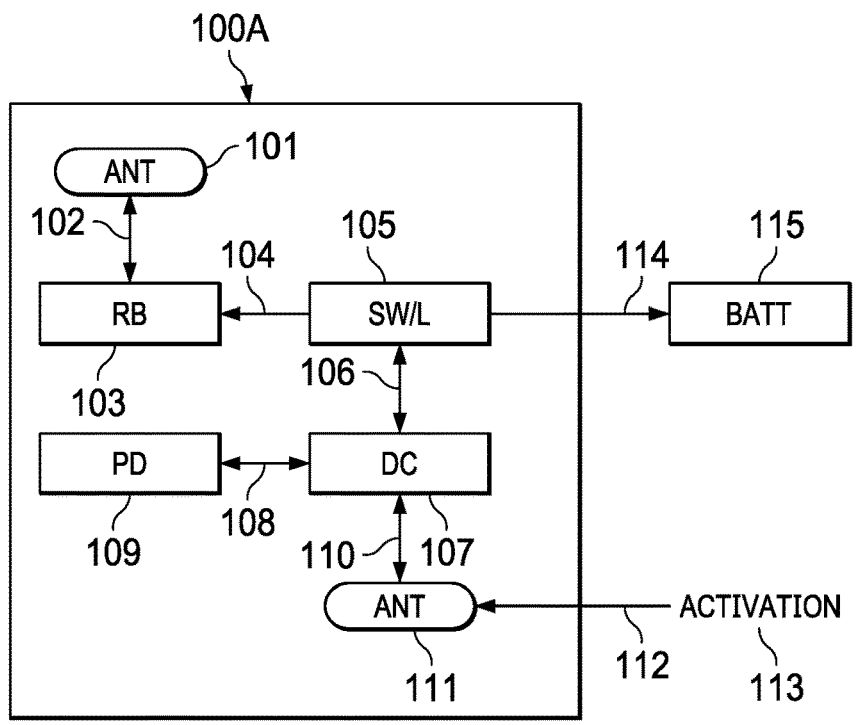
FIGS. 1A-1E show configurations of Flexible Radio Beacons with optional activation means.

Disclosed herein are flexible tags with radio beacons ("Flex Tag") for asset tracking. A Flex Tag represents a flexible tag constructed on a flexible printed circuit board (PCB) that emits a radio beacon. The flexible tag optionally has a battery positioned adjacent to the PCB to power the radio beacon. The optional battery is a thin, flexible or semi-flexible battery, and when included in the flexible tag, forms an integrated transmitter and power source. The disclosed invention is a physically flexible, active radio beacon combined with one or more optional RFID tags in one unit. The RFID tags and the radio beacon may be optionally connected to communicate with each other and/or control each other. The power to the active radio beacon may optionally be provided by a battery, by the RFID tags, or by both.

A physically flexible, active radio beacon which includes one or more RFID tags connected to the beacon for data communications and optionally power use and control is disclosed. This RFID tag can be encoded by external devices, and that encoding can be read by the active radio beacon and subsequently used in radio transmissions by the beacon. The encoding of or communicating with the RFID tag can be used to actuate or toggle the power of the tag from its initial manufactured power-off state, a powered-on state, or from a dormant low power state. The power can optionally be controlled by a physical switch or a combination of encoding actuation and a physical switch. The radio beacon can receive signals and use internal logic to program the RFID tag. The individual radio beacon and RFID tag may each have memory and logic for control. Memory may also be shared between the two units. A central control can optionally be introduced to communicate with and control one or both units.

The flexible tag can be provided with or without RFID and printed with machine readable codes and/or human readable text when in a printable flexible delivery structure. The Flex Tag may also provide for activation via a receiving antenna and decoder which can also act as an RFID enabled passive or active tag. The identification ID of the Flex Tag can be reported through RFID readers. The RFID encoding and any optional encoding is reported to the Flex Tag for storage and broadcast. The RFID component of the Flex Tag can also be reported through the flexible beacon. The signals are received either by standalone, non-edge devices or by edge devices that may be cloud integrated. These receiving devices may be mobile or fixed. The data broadcast by the flexible tag can be stored in the cloud for tracking, identification, status, and other purposes.

The flexible tag can be provided with or without one or more RFID tags and printed with machine readable codes and/or human readable text when in a printable flexible delivery structure. For communication between components, the active radio beacon circuit is connected to one or more RFID tag circuits and antennas where appropriate for data transfer.

The Flex Tag may provide for activation via a receiving antenna and decoder which can also act as an RFID enabled passive or active tag. The RFID tag or tags are connected to one or more switches or fusible links which can control power and/or data to the active radio tag.

The identification ID of both the active radio beacon and the one or more RFID tags of the Flex Tag can be reported through RFID readers. The RFID encoding and any optional encoding is reported to the Flex Tag for storage and broadcast. The RFID component of the Flex Tag can also be reported through the flexible beacon. The signals are received either by standalone, non-edge devices or by edge devices that may be cloud integrated. These receiving devices may be mobile or fixed. The data broadcast by the flexible tag can be stored in the cloud for tracking, identification, status, and other purposes.

The disclosed flexible radio frequency tag has a beacon layer with an integrated transmitter and power source and has an active radio beacon constructed on a flexible printed circuit board. The radio beacon is configured to transmit radio frequency signals, and the radio beacon remains dormant until activated. The flexible radio frequency tag has one or more antenna for receiving and transmitting the radio frequency signals, and an actuatable switch coupled to the radio beacon that when actuated will activate the radio beacon. The flexible radio frequency tag has a battery that is flexible or semi-flexible attached adjacent the flexible printed circuit board and coupled to the switch. The battery remains dormant until activated by the switch, and the radio beacon and battery are an integrated transmitter and power source. A flexible top layer printable with machine readable code, human readable text, or combinations thereof, is affixed to the beacon layer. The flexible RF tag is configured to be in communication with one or more computing device external to and in wireless communication with the flexible RF tag for tracking an asset associated with the flexible RF tag.

The flexible printed circuit board of the flexible radio frequency tag may further include at least one of a pressure device that manually actuates the switch by physical pressing force from an automated device, and a decoder device that electronically actuates the switch by receipt of an external radio signal to one of said one or more antenna. The integrated transmitter and power source in the beacon layer may be activated physically by physical pressing force from the automated device, where a pressing force actuates the switch to activate the radio beacon and the battery. The integrated transmitter and power source in the beacon layer may be activated electronically by an encoding signal from an RFID encoding device, such as an RFID printer.

The flexible radio frequency tag may further include one or more Radio Frequency Identification (RFID) tag connected adjacent the flexible printed circuit board in the beacon layer. The RFID identification can be reportable through the radio beacon and the radio beacon identification can be reportable through the RFID reader for the flexible radio frequency tag. The radio beacon of the flexible radio frequency tag may have data storage and programming capabilities, may transmit and receive radio frequency signals, and may use standards-based radio frequency communication, including one or more of Bluetooth, LoRa, Wireless USB, WiFi, Ultra-Wide Band (UWB), ZigBee, and Bluetooth Low Energy (BLE).

The flexible radio frequency tag may include a bottom layer underlying and affixed to the beacon layer, where the bottom layer provides protection, water resistance and/or adhesion for the flexible RF tag, and the flexible radio frequency tag may also include one or more layer of surrounding material around one or more edge of the beacon layer, where the surrounding material provides support, protection and/or adhesion for the flexible RF tag. The RF tag may be encased in a flexible moisture-resistant coating or a non-flexible container.

The communication system disclosed herein supports processing of communications between a physically flexible radio frequency (RF) tag and a home computer network for asset tracking. The communication system has a first computer server on a home network, and the first computer server has one or more hardware data processors with functionality to receive and process tracking, identification and status information signals relating to one or more trackable assets. The first computer server is coupled to a first database for storing and maintaining information relating to field assets and the first computer server is coupled to a home agent and a first gateway server for communication outside the home network.

The communication system has one or more flexible radio frequency (RF) tag associated with one or more trackable asset. The flexible radio frequency (RF) tag has a beacon layer with an integrated transmitter and power source with an active radio beacon constructed on a flexible printed circuit board. The radio beacon is configured to transmit radio frequency signals, and the radio beacon remains dormant until activated. The radio beacon layer has one or more antenna for receiving and transmitting radio frequency signals; an actuatable switch coupled to the radio beacon that when actuated will activate the radio beacon; and a battery that is flexible or semi-flexible attached adjacent the flexible printed circuit board and coupled to the switch. The battery remains dormant until activated by the switch, and the radio beacon and battery are the integrated transmitter and power source.

The flexible radio frequency (RF) tag of the communication system has a flexible printed circuit board having at least one of a pressure device that may manually actuate the switch by physical pressing force from an automated device, and a decoder device that may electronically actuate the switch by receipt of an external radio signal to or more antenna. The integrated transmitter and power source in the beacon layer may be activated physically by physical pressing force from the automated device, electronically activated by the external radio signal received by one or more antenna, or electronically activated by an encoding signal from an RFID encoding device, such as an RFID printer.

The flexible radio frequency (RF) tag has one or more flexible layer providing support, protection and/or adhesion. Layers are affixed to a top surface, a bottom surface, or around one or more edges, of the beacon layer, at least one of which is a flexible top layer printable with machine readable code and/or human readable text, and the flexible top layer is affixed to the top surface of the beacon layer. The flexible RF tag is configured to be in communication with one or more computing device external to and in wireless communication with the flexible RF tag for tracking an asset associated with said flexible RF tag. The flexible radio frequency (RF) tag may further include one or more RFID tag connected adjacent the active radio beacon.

The communication system also has one or more radio frequency receiving device having application programing to receive radio frequency signals from the RF tag. The radio frequency receiving device receives signals transmitted from the RF tag, and the radio frequency receiving device relays data received from the RF tag to the first computer server. The radio frequency receiving device may be a computer, tablet computer, pad computer, laptop computer, mobile phone, handheld mobile device, or a dedicated radio frequency receiving device. The communication system may also have a base-station transceiver unit coupled to the home network that can receive transmissions from one or more RF tag.

The RF tag transmission utilizes one or more wireless personal area network (WPAN), wireless local area network (WLAN) or wireless wide area network (WWAN) radio frequency communication standards at the physical layer. The communication standards may include one or more of Bluetooth, LoRa, Wireless USB, WiFi, UWB, ZigBee, and Bluetooth Low Energy (BLE).

The communication system may also have a second computer server on a foreign network that is coupled to the radio frequency receiving device, and the radio frequency receiving device can be coupled to a second gateway server for communication outside the foreign network. The radio frequency receiving device receives radio signals transmitted from one or more RF tag, each of the one or more RF tag may be associated with one or more trackable asset and the radio frequency receiving device uses said radio signals to transmit tracking, identification and status information signals that are communicated to the first computer server on the home network.

A method is also disclosed for transmitting communications between a physically flexible radio frequency (RF) tag and a home computer network for asset tracking with the steps of: providing a first computer server on a home network coupled to a first database and a first gateway, where the first computer server has one or more hardware data processors; supporting communications to and from the home network using the first gateway server; providing one or more flexible radio frequency (RF) tag associated with one or more trackable asset; providing a radio frequency receiver device that has application programming to receive transmissions from the beacon, where the radio frequency receiving device is a computer, tablet computer, pad computer, laptop computer, mobile phone, handheld mobile device, or a dedicated radio frequency receiving device; receiving, by the radio frequency receiver device, radio frequency signals transmitted from the radio beacon; relaying transmissions received by the radio frequency receiver device to the first computer server, and storing received transmissions in the database.

The method steps may also include providing for a base-station transceiver unit coupled to the home network that can receive transmissions from one or more RF tag. The method steps may further include providing for a second computer server on a foreign network that is coupled to the radio frequency receiving device, the radio frequency receiving device being coupled to a second gateway server for communication outside the foreign network, and the radio frequency receiving device receiving radio signals transmitted from the RF tag. Each RF tag may be associated with one or more trackable asset. The radio frequency receiving device uses radio signal transmissions to transmit tracking, identification and status information signals that are communicated to the first computer server on the home network.

The flexible radio frequency (RF) tag of the disclosed method has a beacon layer with an integrated transmitter and power source with an active radio beacon constructed on a flexible printed circuit board. The radio beacon is configured to transmit radio frequency signals, and remains dormant until activated. The beacon layer has one or more antenna for receiving and transmitting radio frequency signals, an actuatable switch coupled to the radio beacon that when actuated will activate the radio beacon; and a battery, which is flexible or semi-flexible, attached adjacent the flexible printed circuit board and coupled to the switch, and the battery remains dormant until activated by the switch. The radio beacon and the battery are the integrated transmitter and power source. The flexible RF tag is configured to be in communication with one or more computing device external to and in wireless communication with the flexible RF tag for tracking an asset associated with the flexible RF tag.

The flexible printed circuit board of the flexible RF tag has at least one of a pressure device that manually actuates the switch by physical pressing force from an automated device, and a decoder device that electronically actuates the switch by receipt of an external radio signal to one or more antenna. The flexible printed circuit board may have one or more flexible layers to provide support, protection and/or adhesion. Layers may be affixed to a top surface, a bottom surface, or around one or more edges, of the beacon layer. At least one layer is a flexible top layer that may be printable with machine readable code and/or human readable text, and the flexible top layer is affixed to the top surface of the beacon layer.

The RF tag radio beacon transmission utilizes one or more wireless personal area network (WPAN), wireless local area network (WLAN) or wireless wide area network (WWAN) radio frequency communication standards at the physical layer. The communication standards include one or more of Bluetooth, LoRa, Wireless USB, WiFi, UWB, ZigBee, and Bluetooth Low Energy (BLE).

Varying the component configuration in the flexible tag allows the flexible tags to be optimized for specific use applications. The Flex Tag's radio beacon has optional data storage and programming capability and the beacon can optionally receive as well as transmit data. Flexible tags can be configured for longevity, power conservation, ease of activation and cost per unit depending on how the components are configured. Additionally, the Flex Tag may be encased in an optional moisture resistant coating that is also flexible.

When incorporating a battery into a flexible tag, the radio beacon is attached to a thin, flexible or semi-flexible battery, forming an integrated transmitter and power source. A Flexible tag, in which the radio beacon and battery combination is dormant or with zero or minimal power consumption, may be activated by a switch, either one time or with on/off capabilities. The activation switch of the Flex Tag can be physical or electronic depending on the component configuration in the tag. A dormant Flex Tag's radio beacon having a decoder component can be activated by the RFID encoding signal of an RFID encoding device such as a printer. A dormant Flex Tag's radio beacon having a pressure device can be activated by physical pressing force from an automated device. A Flex Tag can have a both decoder and pressure component functionalities to provide activation options for the device. In another configuration, there is no activation switch and the unit will be active immediately once the battery is connected to the PCB.

The flexible tag can be activated by an external radio signal where the signal provides the power to take the unit out of dormant mode via an actuatable switch, fuse or other device. Optionally, the frequency and amplitude of the received signal may have restrictions for activation to occur. Multiple frequency and amplitude combinations may be optionally required for activation. External activation signals can also go through a decoder, requiring one or more coding/decoding algorithms to control activation of the flexible tag. The tags can also optionally be activated by physical pressing force from an automated device.

The radio beacon in the flexible tag utilizes one or more wireless personal area network (WPAN), wireless local area network (WLAN) or wireless wide area network (WWAN) radio frequency communication standards at the physical layer. The radio beacon can utilize standards-based radio frequency communication and non-standards based radio frequency communication. Standards-based radio frequency communication can be one or more of Bluetooth, LoRa, Wireless USB, WiFi, Ultra-Wide Band (UWB), and ZigBee. The radio beacon can use one or more of the Bluetooth standards including Bluetooth Low Energy (BLE). System connectivity may be accomplished via various types of networks including, but not limited to, Wireless Personal Area Networks (WPAN), Wireless Local Area Networks (WLAN) and Wireless Wide Area Networks (WWAN). The radio frequency communication may also be accomplished by using a non-standards-based methodology. This non-standards-based communication may be in various parts of the spectrum such as the Industrial, Medical and Scientific bands or various licensed bands as needed. This flexibility of communication standards and communication frequencies allows for diverse use cases.

FIGS. 1A-1E show configurations of flexible active radio beacons with options for activation. These configurations represent a few of the possible configurations and are not limited to these configurations only. Varying the components included in the flexible beacons allows the flexible tags to be configured in a wide variety of ways. Flexible tags can be configured for longevity, power conservation, ease of activation and cost per unit depending on how the components are configured in the unit. Like reference numeral in FIGS. 1A-1E refer to like structures in the figures.

FIG. 1A shows a flexible active radio beacon having a multi-component flexible printed circuit board (PCB) 100A configured with a radio beacon 103 and a battery 115 adjacent to the PCB 100A. The radio beacon 103 is connected 104 to a switch/link 105 that can activate the radio beacon 103 in response to an activation event.

The activation event for the Flex Tag can be electronic or physical. An activation event can be electronic signals to the switch/link 105 received via an activation receiving/transmitting antenna 113 outside of the flexible tag delivered via 112 to an internal receiving antenna 111 in the PCB 100A. The internal receiving antenna 111 is connected 110 to a decoder 107 that relays 106 the activation instruction to the switch/link 105. The switch/link 105 in turn activates the radio beacon 103 via connection 104. The radio beacon 103 can be activated by an external radio signal where the signal provides the power to take the unit out of dormant mode via a switch/link 105, which may be an actuatable switch, link, fuse or other device that can facilitate activating the radio beacon 103.

Optionally, the frequency and amplitude of the received signal may have restrictions for activation of the beacon to occur. Optionally, multiple frequency and amplitude combinations are required for activation allowing for precise control of when and how the flexible tag is activated. Optionally, the radio beacon 103 can be activated by the RFID encoding signal of an RFID encoding device, such as an RFID printer.

The activation event for the beacon 103 may also occur via pressure applied to the flexible tag. There is a pressure device 109 connected 108 to the decoder 107 wherein pressure applied to the pressure device 109 in the flexible tag during pressing from an automated device will cause activation instructions to be relayed to the radio beacon 103.

Once activated, either by an electronic or physical event, the radio beacon 103 transmits signals via the radio beacon antenna 101 connected 102 to the radio beacon 103. Optionally, the radio beacon antenna 101 can also receive data for the radio beacon 103. Optionally, the radio beacon 103 has data storage and programming capabilities.

Once an activation signal is received, the switch 105 activates the battery 115 via connection 114 to power the device. The radio beacon 103 is attached to a battery 115 that is thin, flexible or semi-flexible, forming an integrated transmitter and power source. The radio beacon 103 and battery 115 combination is dormant, with zero or minimal power consumption until activation by the switch 105. The activation may be either one time or have on/off capabilities.

Figure 1B:
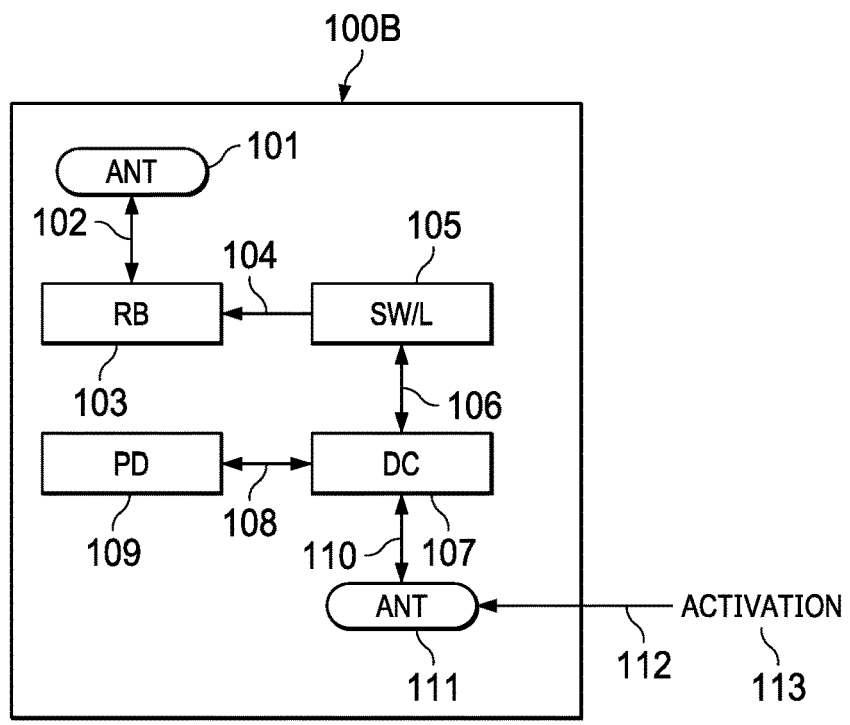

FIG. 1B shows a flexible active radio beacon having a multi-component flexible printed circuit board (PCB) 100B configured with a radio beacon 103, but no battery. In configurations with no battery the radio beacon in the flexible tag remains in a passive mode until activation is powered by signals received from an RFID reader.

Once activated, the radio beacon 103 transmits signals via the radio beacon antenna 101 connected 102 to the radio beacon 103. Optionally, the radio beacon antenna 101 can also receive data for the radio beacon 103. Optionally, the radio beacon 103 has data storage and programming capabilities.

Figure 1C:
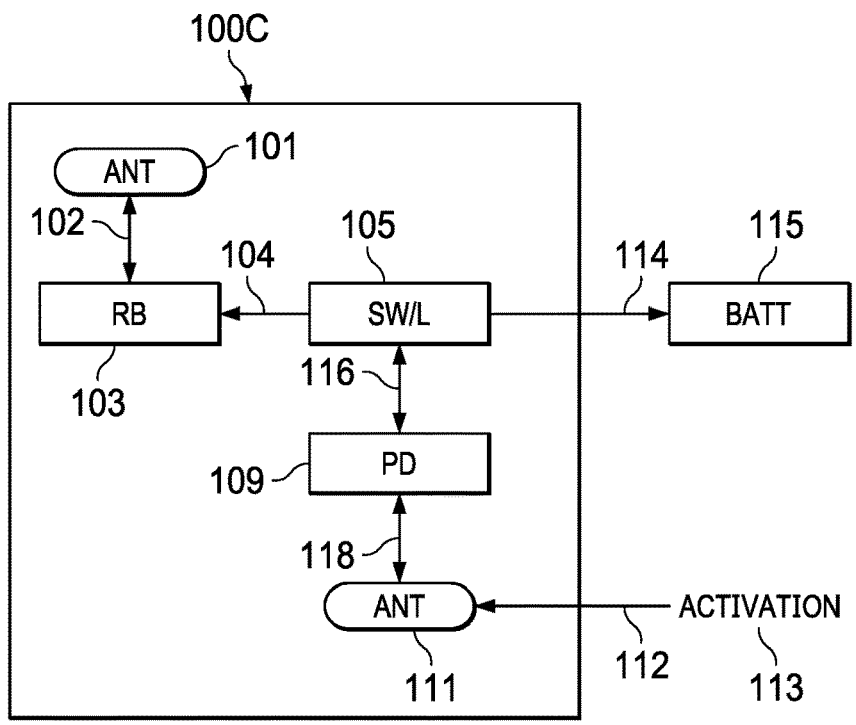

FIG. 1C shows a flexible active radio beacon having a flexible printed circuit board (PCB) 100C configured with a radio beacon 103 and a pressure device 109, but no decoder. Optionally, the flexible tag has a battery 115 adjacent to the PCB 100C.

The activation event for the active radio beacon 103 shown in FIG. 1C will occur via pressure applied to the flexible tag. The pressure applied to the pressure device 109 in the flexible tag during pressing from an automated device will cause activation of the radio beacon 103.

When an activation signal is received, the switch 105 also activates the battery 115 via connection 114 to power the device. The radio beacon 103 is attached to a battery 115 that is thin, flexible or semi-flexible, forming an integrated transmitter and power source. The radio beacon 103 and battery 115 combination is dormant, with zero or minimal power consumption until activation by the switch 105. The activation may be either one time or have on/off capabilities.

Once activated by a physical event, the radio beacon 103 transmits signals via the radio beacon antenna 101 connected 102 to the radio beacon 103. Optionally, the radio beacon antenna 101 can also receive data for the radio beacon 103. Optionally, the radio beacon 103 has data storage and programming capabilities.

Figure 1D:
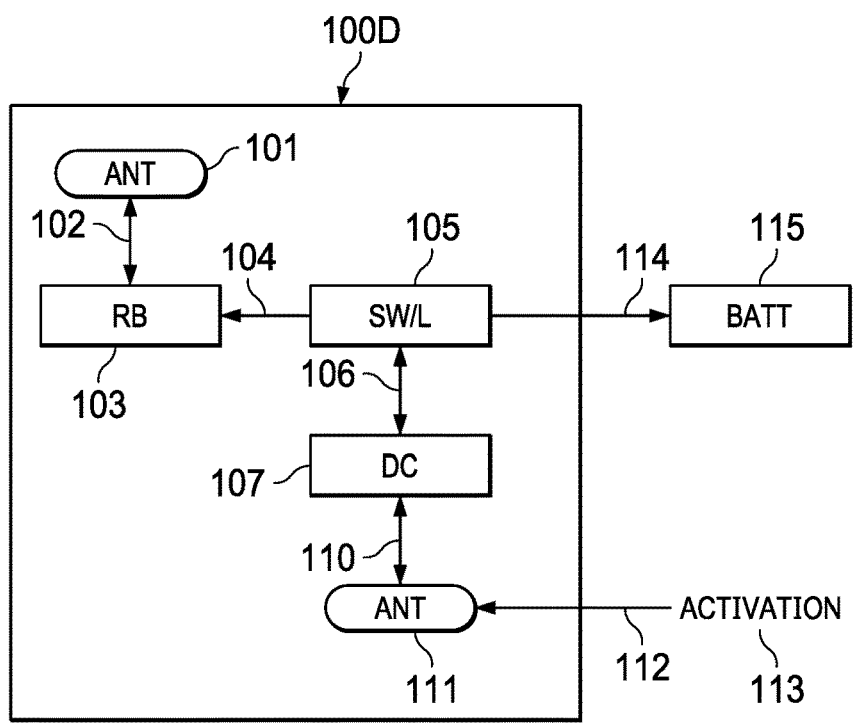

FIG. 1D shows a flexible active radio beacon having a flexible printed circuit board (PCB) 100D configured with a radio beacon 103 and a decoder 107, but no pressure device. Optionally, the flexible tag has a battery 115 adjacent to the PCB 100D.

The activation event for the flexible active radio beacon shown in FIG. 1D will be electronic. An activation event will be one or more electronic signals to the switch/link 105 received via an activation receiving/transmitting antenna 113 outside of the flexible tag via wireless delivery 112 to an internal receiving antenna 111 in the PCB 100D. The internal receiving antenna 111 is connected 110 to a decoder 107 that relays 106 the activation instruction to the switch/link 105. The switch/link 105 in turn activates the radio beacon 103 via connection 104. The radio beacon 103 can be activated by an external radio signal where the signal provides the power to take the unit out of dormant mode via a switch/link 105, which may be an actuatable switch, link, fuse or other device that can facilitate activating the radio beacon 103.

Optionally, the frequency and amplitude of the received signal may have restrictions for activation of the beacon to occur. Optionally, multiple frequency and amplitude combinations are required for activation allowing for precise control of when and how the flexible tag is activated. Optionally, the radio beacon 103 can be activated by the RFID encoding signal of an RFID encoding device, such as a printer.

When an activation signal is received, the switch 105 also activates 114 the battery 115 to power the device. The radio beacon 103 is attached to a battery 115 that is thin, flexible or semi-flexible, forming an integrated transmitter and power source. The radio beacon 103 and battery 115 combination is dormant, with zero or minimal power consumption until activation by the switch 105. The activation may be either one time or have on/off capabilities.

Once activated by an electronic signal, the radio beacon 103 transmits signals via the radio beacon antenna 101 connected 102 to the radio beacon 103. Optionally, the radio beacon antenna 101 can also receive data for the radio beacon 103. Optionally, the radio beacon 103 has data storage and programming capabilities.

Figure 1E:
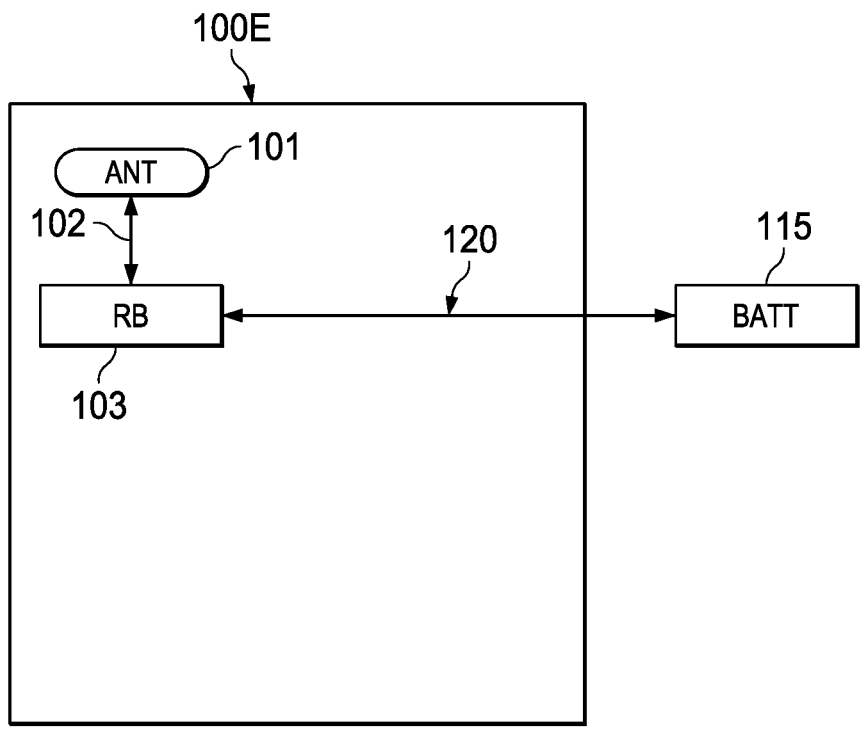

FIG. 1E is a flexible beacon having a flexible printed circuit board (PCB) 100E configured with a radio beacon 103 and a battery 115 adjacent to the PCB 100E. In this tag configuration, the radio beacon is activated via 120 when the battery 115 is attached to the PCB 100E. No switch, decoder or pressure device is needed in this configuration.

Once activated by connecting the radio beacon 103 to the battery 115, the radio beacon 103 transmits signals via the radio beacon antenna 101 connected 102 to the radio beacon 103. Optionally, the radio beacon antenna 101 can also receive data for the radio beacon 103. Optionally, the radio beacon 103 has data storage and programming capabilities.

Structure of the Flexible Tags

The placement of the Flex Tag's radio beacon and battery combination can occur in sandwiched structures consisting of a minimum of a top layer and an underlying beacon layer. One or more layer of material can optionally be included to surround the edges of the Flex Tag's beacon in an inner layer for ease of manufacturing, protection, or other uses. A multi-layer structure with additional layers for other purposes, such as protection, waterproofing, or adhesion of a Flex Tag can also be advantageously used with the present invention. FIGS. 2A-2D show configurations of layers useful for the flexible tag. Like reference numeral in FIGS. 2A-2D refer to like structures in the figures.

Figure 2A:
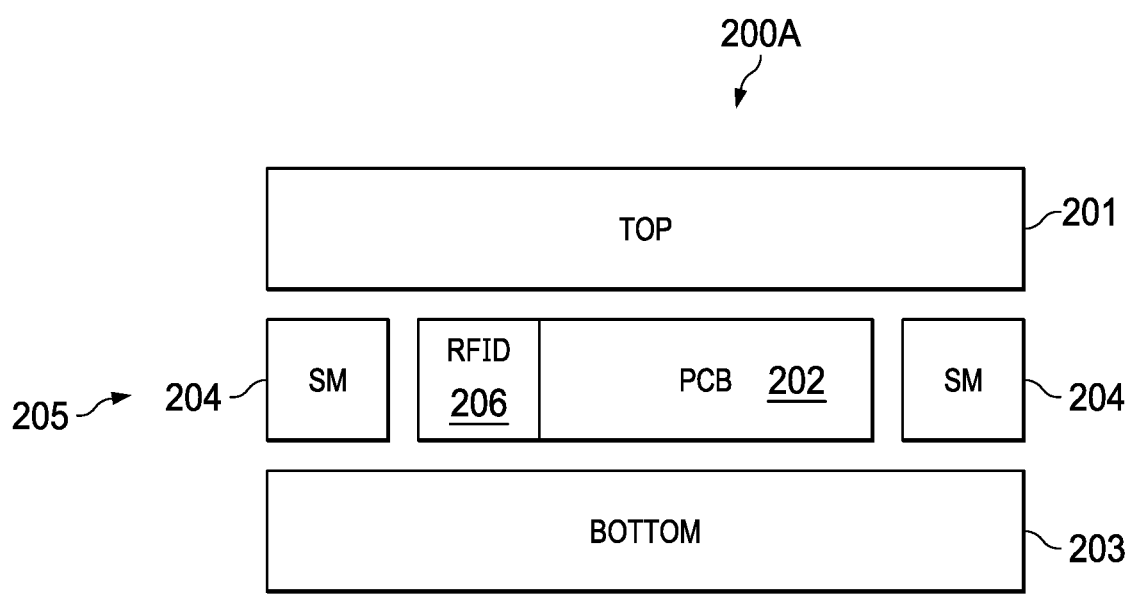
FIG. 2A shows Flexible Delivery Structures with top, inner and bottom layers.

FIG. 2A shows one possible configuration 200A of a three-layer structure for a Flex Tag having a flexible top layer, one or more inner (beacon) layer and a bottom layer. The top layer 201 is used for human readable text (printing) and/or machine-readable identification, such as barcodes and QR codes. The inner layer 205 houses the printed circuit board (PCB) radio beacon 202, optional one or more RFID tag 206 connected to the (PCB) radio beacon 202, and optional surrounding material 204 around all sides of the beacon 202 for support, cushioning or protection. Optionally, other identification tag technology can be used with or instead of RFID tags. The flexible tag optionally may include a battery. In configurations with a battery, a flexible or semi-flexible battery is connected adjacent to the PCB beacon 202 and is also surrounded by surrounding material 204. If the flexible tag configuration includes an optional RFID tag, the tag is positioned in the inner beacon layer 205 connected adjacent to the PCB radio beacon 202. A bottom layer 203 completes the tag sandwich, and in some embodiments, the bottom layer may include an adhesive component, such as is found in standard printed labels.

The top and bottom layers are flexible and can be of moisture resistant materials to provide protection for the encased radio beacon 202. Alternatively, a moisture resistant coating can be applied to the top and bottom layers of the flexible tag. Providing human readable text on the top surface 201 allows for visual identification of assets by personnel. Inclusion of machine readable code can assist personnel in tracking individual assets allowing for tagged assets to be located manually, if needed. When a passive RFID portion is included in the flexible tag, the system will optionally continue to work with an RFID reader when the beacon battery is exhausted. When used in concert, the active radio beacon, RFID, machine readable coding, and human readable text ensures assets can be identified in the event of a signal or power interruption, in remote locations, or after battery exhaustion.

Figure 2B:
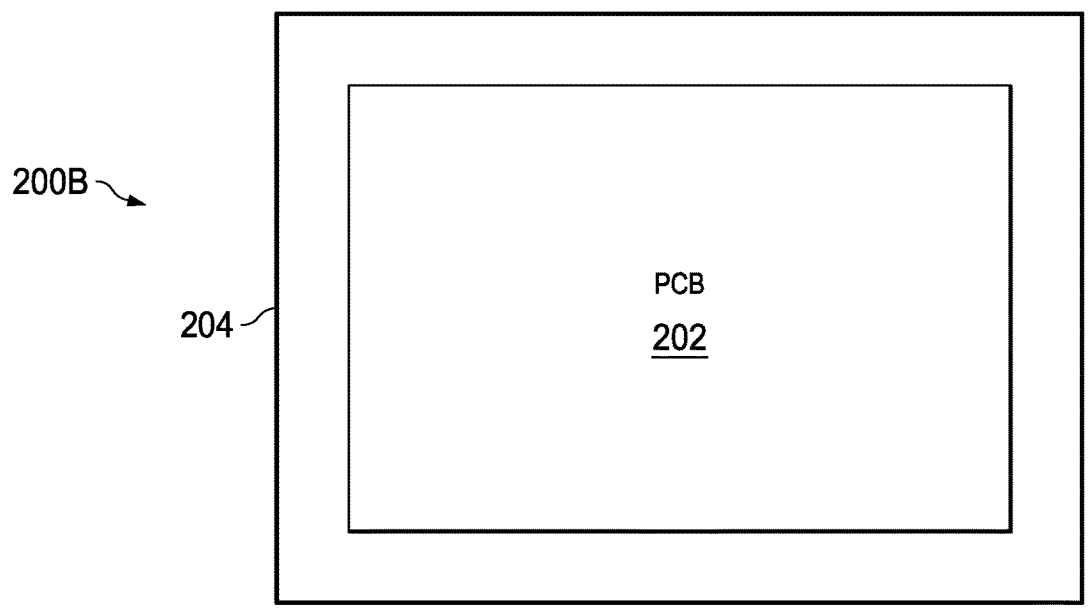
FIG. 2B shows Flexible Delivery Structures in a top view of the inner layer.

In FIG. 2B, a top view 200B of an inner layer for the flexible tag shown in FIG. 2A. In this view, the PCB beacon 202 is surrounded on all sides by a layer of surrounding material 204 that can provide protection and support to the beacon. In configurations with a battery, a flexible or semi-flexible battery is connected adjacent to the PCB beacon 202 in the inner beacon layer and is also surrounded by surrounding material 204. One or more layers of surrounding material may be incorporated into the inner layer of the tag structure to accommodate the flexible active radio beacon. Optionally, the inner beacon layer may include one or more RFID tags or other identification tag technology connected adjacent to the radio beacon.

Figure 2C:
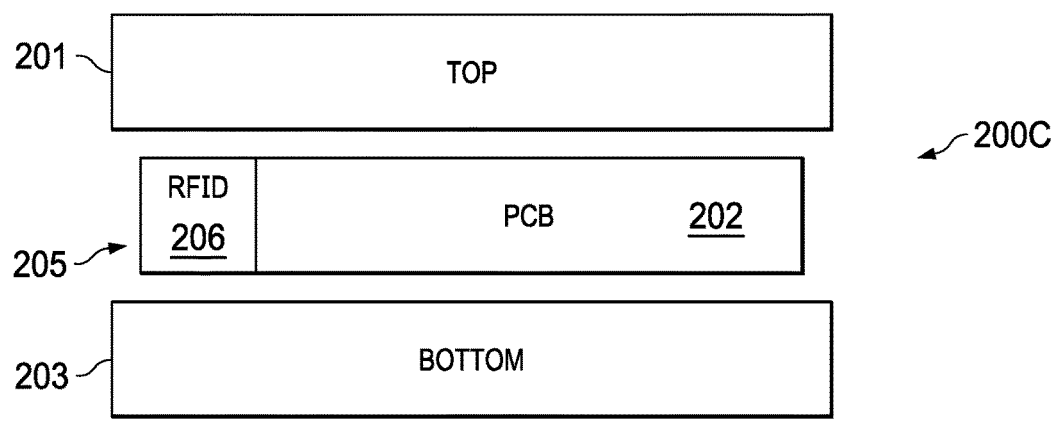
FIGS. 2C and 2D show Flexible Delivery Structures with differing layer configurations.

FIG. 2C shows another possible configuration 200C of a three-layer structure for a Flex Tag having top, inner (beacon) and bottom layers. The top layer 201 is flexible and is used for human readable text (printing) and/or machine-readable identification such as barcodes and QR codes. The inner layer 205 has the printed circuit board (PCB) beacon 202, and optionally, has one or more RFID tag 206 connected to the (PCB) radio beacon 202. Optionally, other identification tag technology can be used with or instead of RFID tags. In configurations with a battery, a flexible or semi-flexible battery is connected adjacent to the PCB beacon 202 and is also part of the inner beacon layer 205. In configurations with RFID, the RFID tags 206 are connected adjacent to the PCB beacon 202 and are also part of the inner beacon layer 205. A bottom layer 203 completes the tag sandwich and includes, optionally, an adhesive component, such as that found in standard printed labels. The beacon 202 is positioned between the top layer 201 and the bottom layer 203. The beacon 202 may extend to the edges of the top 201 and bottom 203 layers and be secured to those layers, or alternatively, the layer with the beacon 202 may be smaller than the top 201 and bottom 203 layers and be held between the layers when the top 201 and bottom 203 layers are secured together. If the flexible tag configuration includes the optional battery, the battery is positioned in the inner beacon layer 205 adjacent to the radio beacon 202. If the flexible tag configuration includes one or more optional RFID tag, the RFID tags 206 are connected in the inner beacon layer 205 adjacent to the radio beacon 202.

The top and bottom layers can be of moisture resistant materials to provide protection for the encased flexible active radio beacon 202. Alternatively, moisture resistant coating can be applied to the top and bottom layers of the flexible tag. Providing human readable text on the top surface 201 allows for visual identification of assets by personnel. Inclusion of machine readable code can assist personnel in tracking individual assets allowing for tagged assets to be located manually, if needed. When a passive RFID portion is included in the flexible tag, the system will optionally continue to work with an RFID reader when the beacon battery is exhausted. When used in concert, the active radio beacon, RFID, machine readable coding and human readable text ensures assets can be identified in the event of a signal or power interruption, in remote locations, or after battery exhaustion.

Figure 2D:
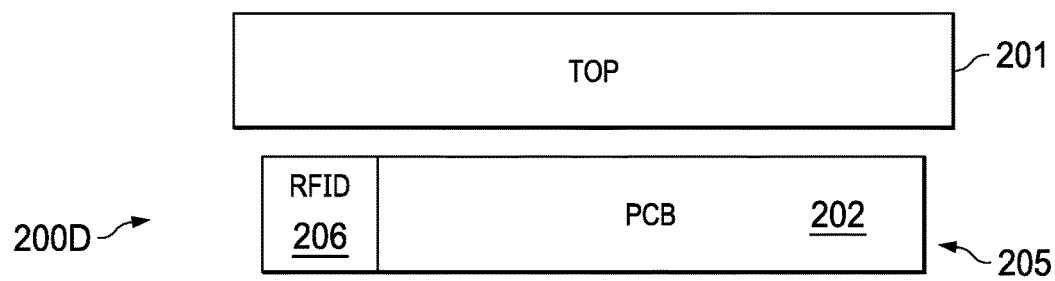

FIG. 2D shows a possible configuration 200D of a two-layer structure for a Flex Tag having a top layer 201 secured to the layer with the PCB beacon 202, without an underlying bottom layer. Optionally, the beacon layer has one or more RFID tag 206 connected to the (PCB) radio beacon 202. Optionally, other identification tag technology can be used with or instead of RFID tags. The flexible tag optionally may include a battery. If the flexible tag configuration includes the optional battery, the battery is positioned adjacent to the beacon 202. This configuration can provide for a thin flexible tag. Optionally, the top layer 201 in this configuration has an adhesive portion to secure the flexible tag to the asset. Optionally, the top layer has a moisture resistant coating. If the flexible tag configuration includes the optional RFID, the RFID tags 206 are connected adjacent to the radio beacon 202.

Providing human readable text on the top surface 201 allows for visual identification of assets by personnel. Inclusion of machine readable code can assist personnel in tracking individual assets allowing for tagged assets to be located manually, if needed. When a passive RFID portion is included in the flexible tag, the system will optionally continue to work with an RFID reader when the beacon battery is exhausted. When used in concert, the active radio beacon, RFID, machine readable coding, and human readable text ensures assets can be identified in the event of a signal or power interruption, in remote locations, or after battery exhaustion.

The inner layers of FIGS. 2A, 2C, and the beacon layer of FIG. 2D can optionally be constructed using multiple layers. Surrounding material may be used to create continuous, stackable layers in the flexible tag.

Assets Tagging Examples

FIGS. 3A-3E show the flexible tag may be affixed to curved and flat surfaces of assets for tacking of individual items as well as a multiplicity of items associated with a pallet or container. Each of the examples in FIGS. 3A-3E show flexible tags for tracking one or more individual assets or combinations of assets and show only a fraction of the possible uses for flexible tagging of assets for tracking and management. The inclusion of an optional adhesive backing to the flexible tags allows for tagging and tracking of previously hard-to-tag items, such as assets having curved, narrow, or irregular surfaces.

Figure 3B:
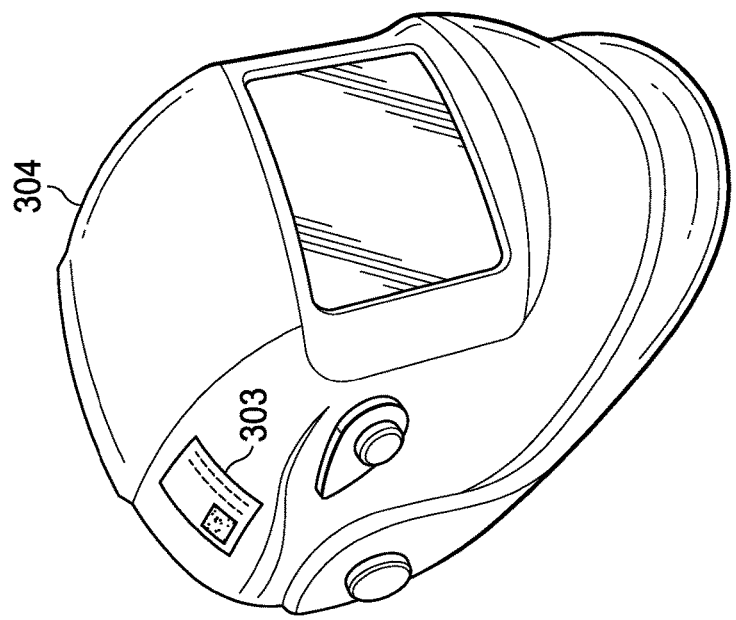
FIGS. 3A-3E show examples of the flexible tags on asset surfaces.
Figure 3A:
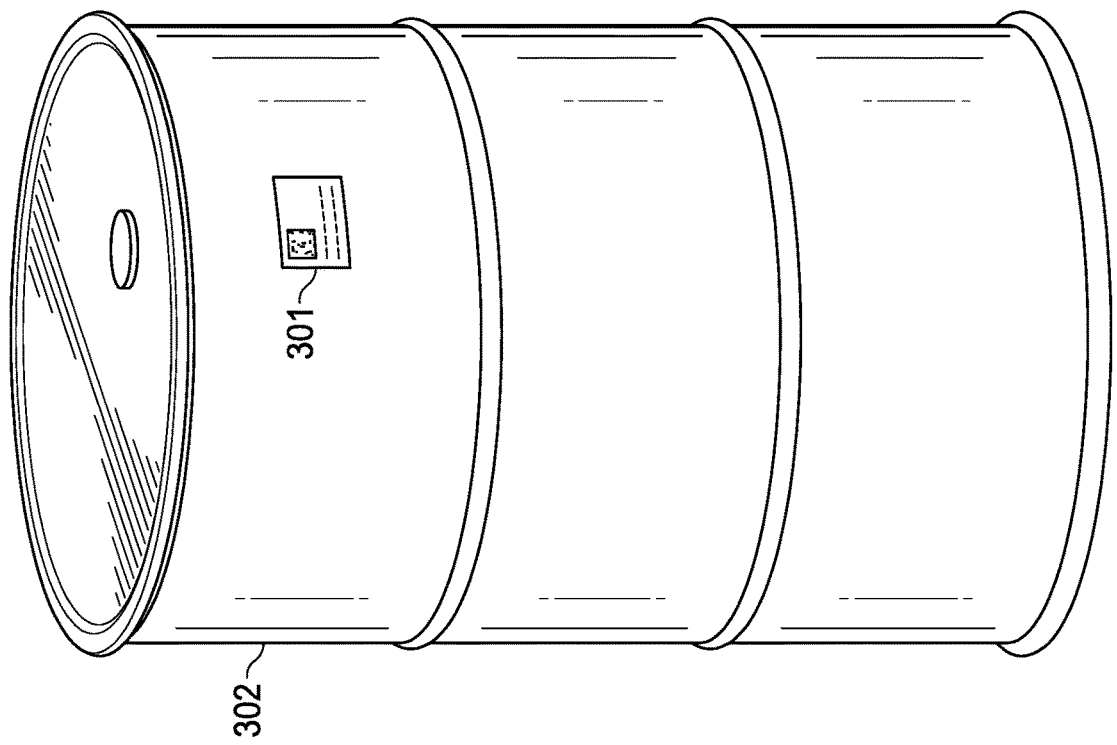

FIGS. 3A and 3B show flexible tags affixed to individual assets for tracking. FIG. 3A shows a flexible tag 301 affixed to the curved side surface of a barrel or drum container 302. FIG. 3B shows a flexible tag 303 affixed to the curved side surface of a welding helmet 304.

Figure 3C:
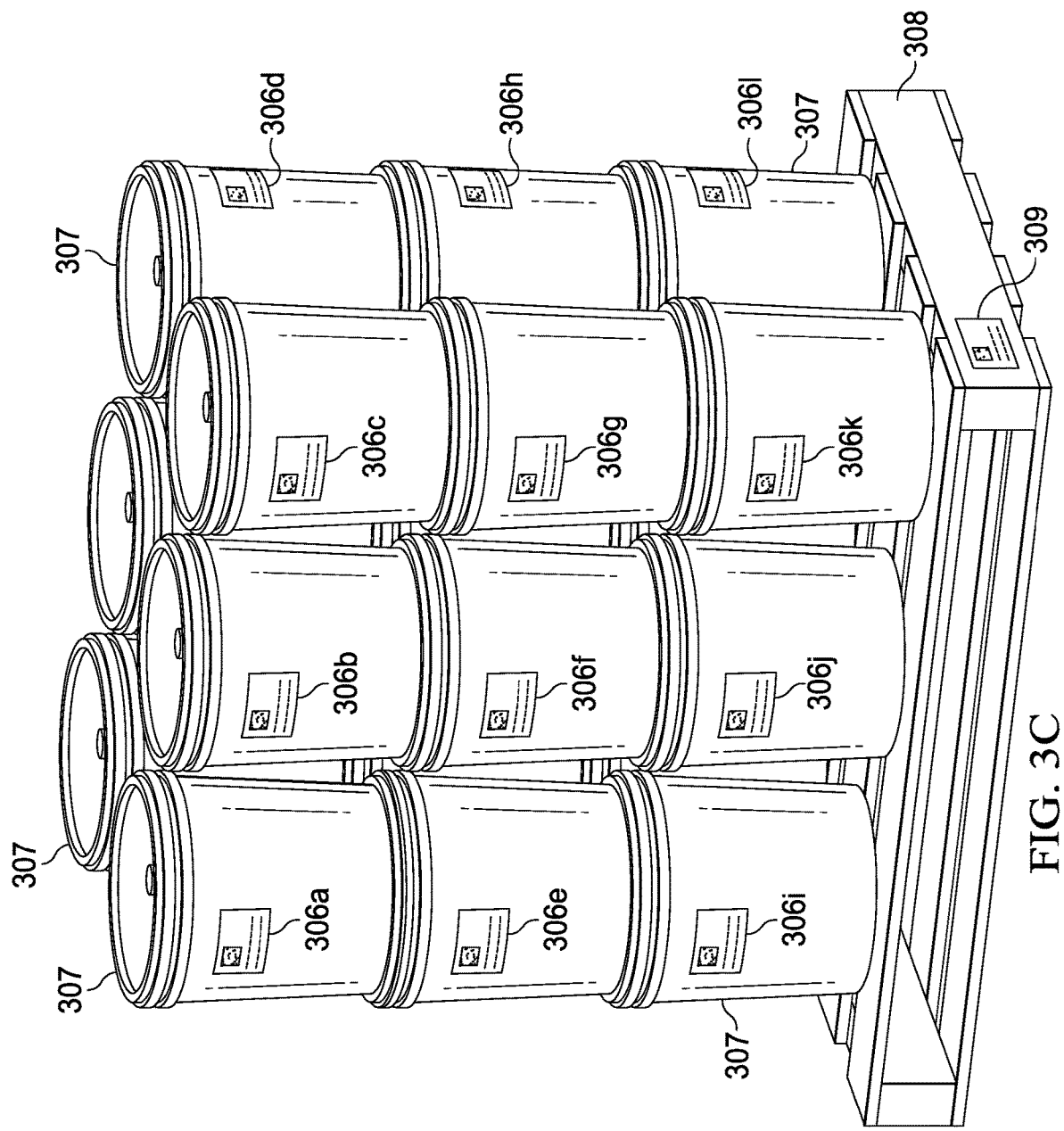
Figure 3D:
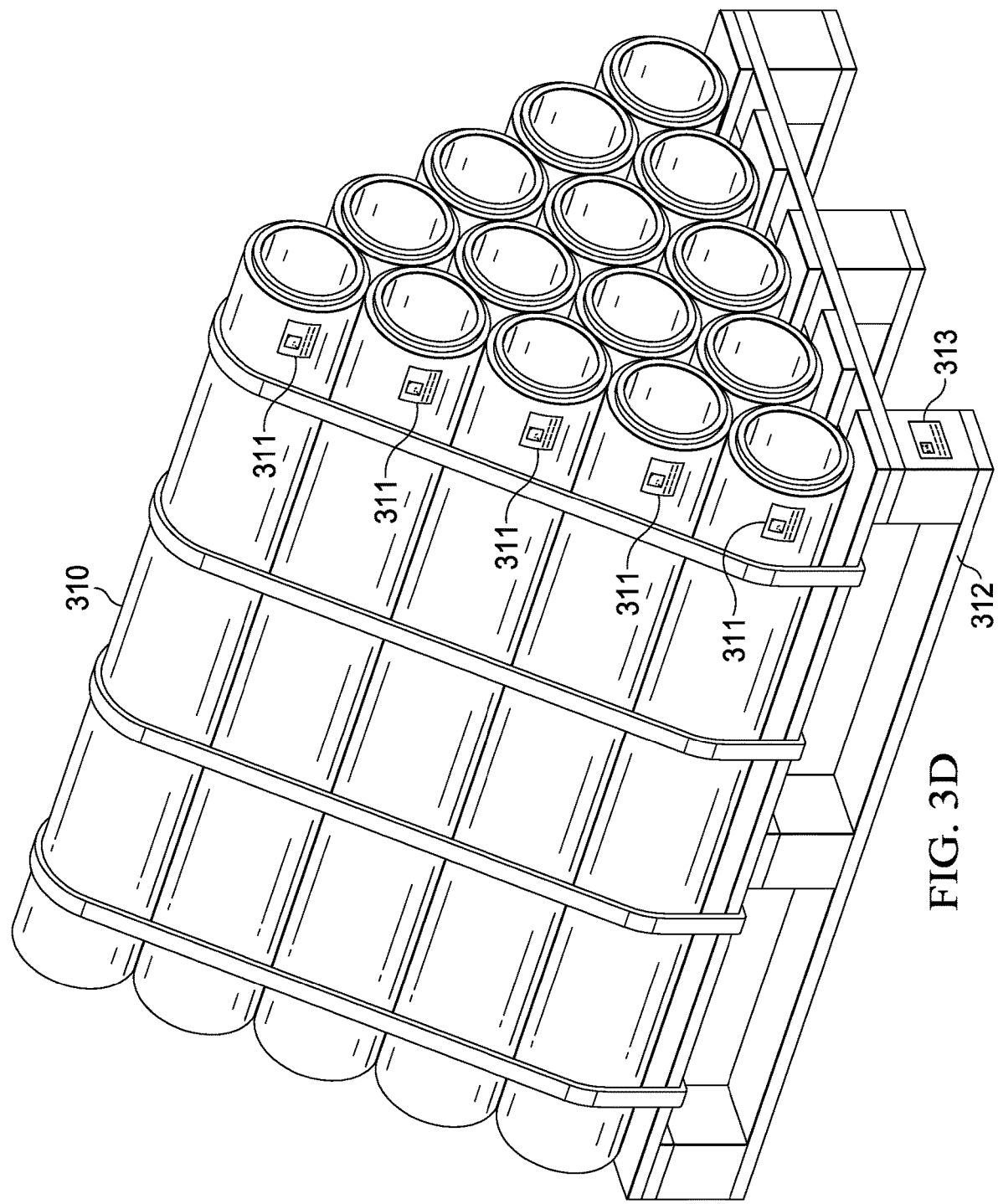

FIGS. 3C and 3D show the flexible tag affixed to combinations of similar assets. FIG. 3C shows a pallet 308 of stacked buckets 307. All of the buckets would be individually tagged for asset tracking purposes and it can be seen that each visible bucket is tagged with a flexible tag 306(a)-306(l). The pallet 308 is also tagged 309, allowing for the group of buckets to be tracked as well as the number of individual buckets in the grouping.

FIG. 3D shows a pallet 312 of stacked pipes 310. A flexible tag 311 can be placed on all of the pipes, as seen on the visible side surface of the pipes. The pallet 312 is also tagged 313, allowing for the pipes to be tracked associated with a pallet 312 as well as for the individual pipes 310. One advantage of the flexible tags is the ability to tag assets with curved surfaces, even if the surfaces are small as would be seen with small diameter pipes. An optional adhesive backing allows the flexible tags to be affixed to various sized assets composed of a variety of materials.

Figure 3E:
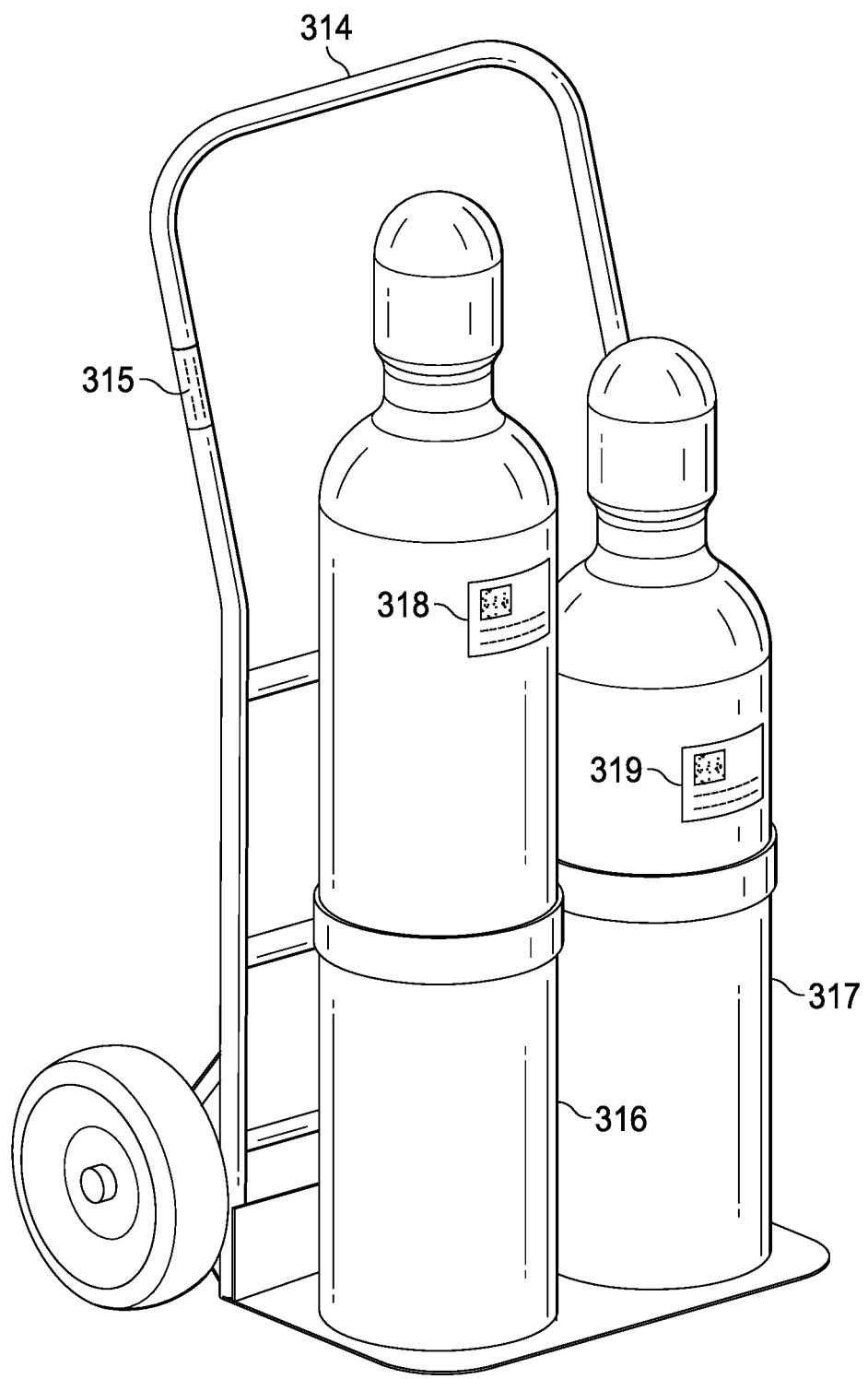

FIG. 3E shows the flexible tag affixed to combinations of dissimilar assets. FIG. 3E shows a cylinder cart 314 loaded with two different types of cylinders. Both the large cylinder 316 and the small cylinder 317 have a flexible tag (318, 319) affixed to curved sides of the cylinders. The cylinder cart 314 also has a flexible tag 315 affixed to the curved handle of the cart.

A non-flexible encasement of the Flexible Delivery Structure is also envisioned. The Flex Tag (including the battery combination) can also be inserted into non-flexible or hard containers and cases. All modes for activation, encoding, and integration with RFID and machine-readable codes would still be applicable to the tag. Placing the flexible tag in a non-flexible or hard case would allow for additional uses of the flexible tag, including situations where assets might be exposed to inclement weather or for use as temporary personnel badges. For example, flexible tags can be printed and activated, then inserted into reusable non-flexible badges for identification of temporary personnel or for groups of visitors.

Combination beacons with RFID and Machine-Readable Codes are also envisioned. The flexible tag can be provided with or without RFID and printed with machine readable codes when in a printable flexible delivery structure. The Flex Tag may also provide for activation via a receiving antenna and decoder which can also act as an RFID enabled passive or active tag. The identification ID of the Flex Tag can be reported through RFID readers. The RFID encoding and any optional encoding is reported to the Flex Tag for storage and broadcast. The RFID component of the Flex Tag can also be reported through the flexible beacon.

System Configuration Examples

The flexible tags work within an asset tracking system that can transmit activation signals to the active radio beacons and receive data from those beacons. Assets that are tagged with the Flex Tags can be identified through a variety of means, including wireless communication with a mobile device, such as a laptop computer, tablet computer, smart mobile device, or other mobile device with RF reading capabilities. The system may include one or more wireless networks, computer servers, databases, base stations, and antennas that can be individually configured for specific locales and tagged asset groups. The flexible tags can also have RFID and/or machine-readable codes that can be read by scanners or readers, including dedicated reading devices and mobile devices having compatible applications enabled to read the codes. These devices can transmit data to other system components, such as computer servers and controllers for asset management. The flexible tags can also have human readable text printed on the tags to enable visual identification of the assets in addition to electronic identification. The signals are received either by standalone, non-edge devices, or by edge devices that may be cloud integrated. These receiving devices may be mobile or fixed. The data broadcast by the flexible tags can be stored in the cloud for tracking, identification, status, and other purposes.

Figure 4:
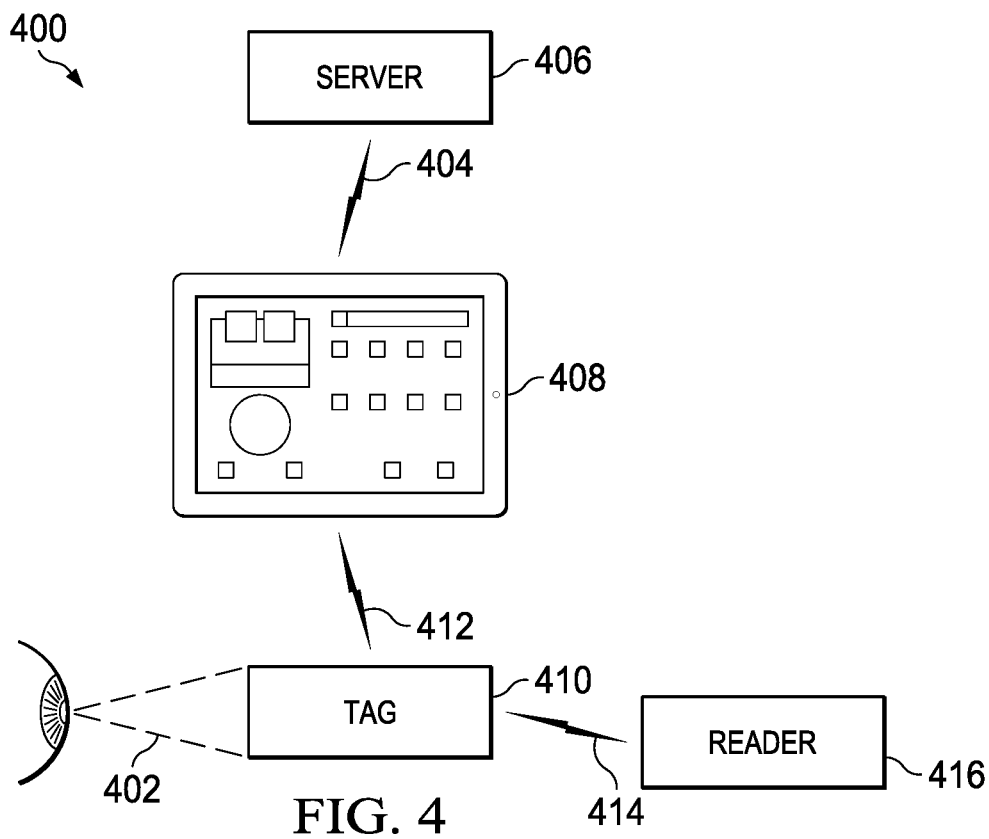
FIGS. 4-7 show component block diagrams for several configurations utilizing the flexible tag of the present invention.

As shown in FIG. 4, for system configuration 400, the flexible tag 410 is coupled to a digital device 408, such as a computer, tablet computer, pad computer, laptop computer, mobile phone, handheld mobile device, or a dedicated radio frequency receiving device, via radio frequency wireless communication 412. The digital device 408 wirelessly interfaces 404 with the home network computer server 406. The flexible tag 410 may also include RFID or machine readable codes, such as barcodes or QR codes, which can be read by a mobile or stationary reader 416, such as a barcode scanner, QR code scanner, RFID reader, or other compatible signal reader, via wireless communication 414. The flexible tag 410 may also be printed with human readable text for visual readability 402.

Figure 5:
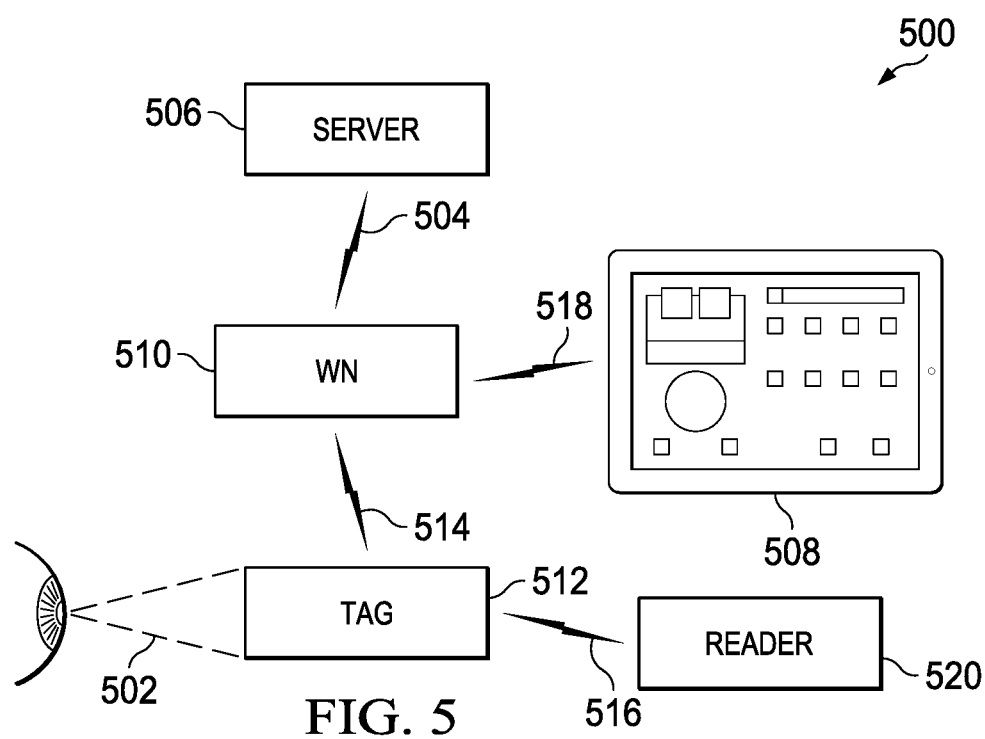

As shown in FIG. 5, for system configuration 500, the flexible tag 512 is coupled 514 to a wireless network communication hub 510 via radio frequency wireless communication. The wireless network communication hub 510 wirelessly interfaces 518 with a digital device 508, such as a computer, tablet computer, pad computer, laptop computer, mobile phone, handheld mobile device, or a dedicated radio frequency receiving device, and also wirelessly interfaces 504 with the home network computer server 506. The flexible tag 512 may also include RFID or machine readable codes, such as barcodes or QR codes, which can be read by a mobile or stationary reader 520, such as a barcode scanner, QR code scanner, RFID reader, or other compatible signal reader via wireless communication 516. The flexible tag 512 may also be printed with human readable text for visual readability 502.

Figure 6:
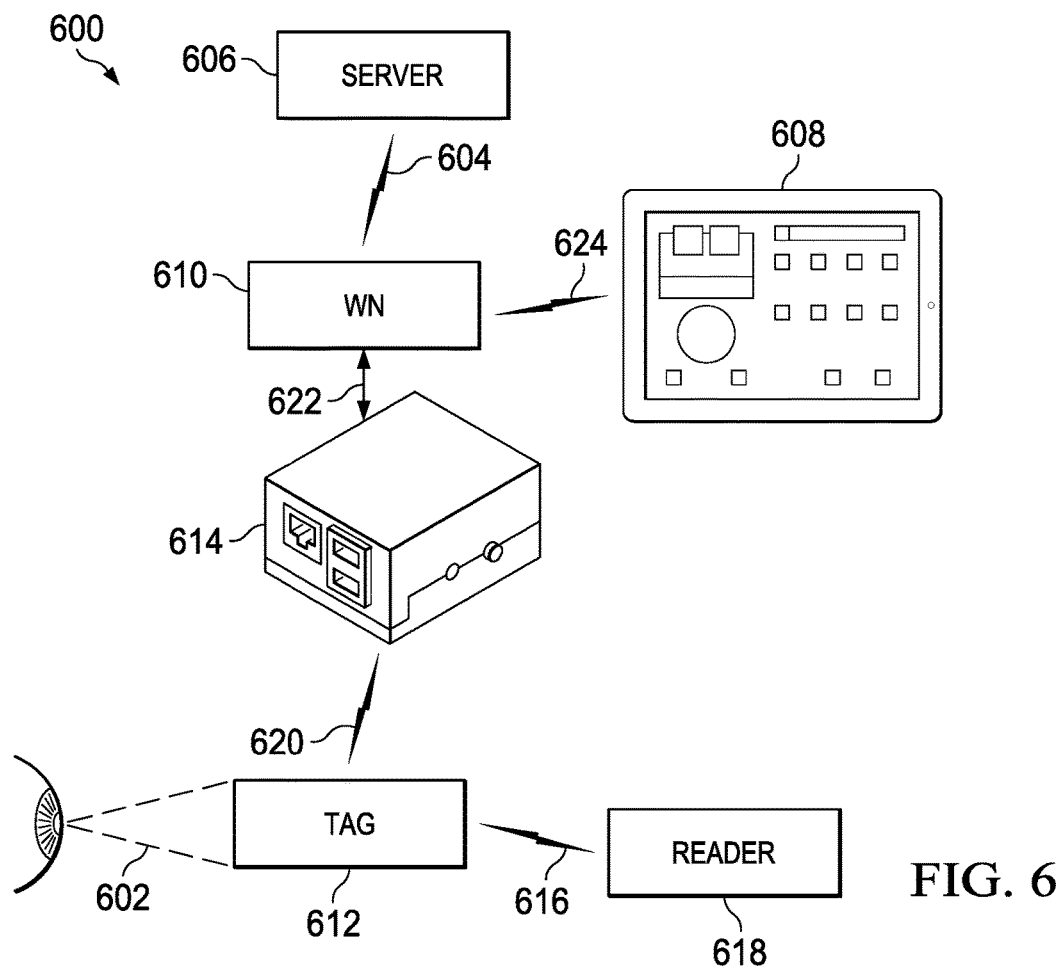

As shown in FIG. 6, for system configuration 600, flexible tag 612 is coupled to a first server computer 614 via radio frequency wireless communication 620. The first server computer 614 is separately coupled 622 to a wireless network communication hub 610. The wireless network communication hub 610 is coupled 624 to a digital device 608, such as a computer, tablet computer, pad computer, laptop computer, mobile phone, handheld mobile device, or a dedicated radio frequency receiving device, and separately coupled 604 to the home network computer server 606. The flexible tag 612 may also include RFID or machine readable codes, such as barcodes or QR codes, which can be read by a mobile or stationary reader 618, such as a barcode scanner, QR code scanner, RFID reader, or other compatible signal reader via wireless communication 616. The flexible tag 612 may also be printed with human readable text for visual readability 602.

Figure 7:
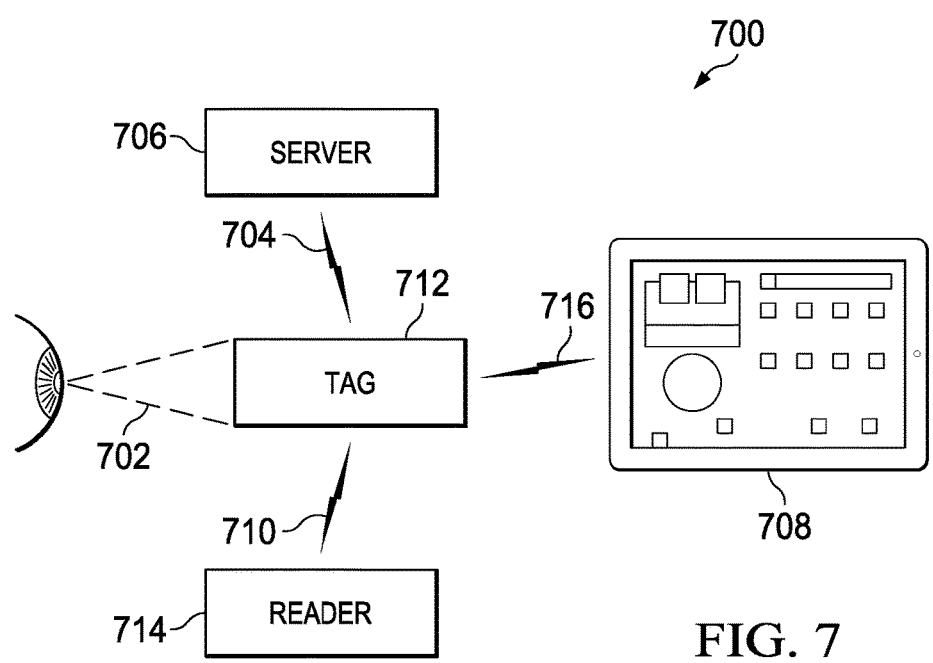

As shown in FIG. 7, for system configuration 700, flexible tag 712 is coupled via radio frequency wireless communication 716 to a digital device 708, such as a computer, tablet computer, pad computer, laptop computer, mobile phone, handheld mobile device, or a dedicated radio frequency receiving device. The flexible tag 712 separately wirelessly interfaces 704 with the home network computer server 706. The digital device 708 may also wirelessly interface with the home network computer server. The flexible tag 712 may also include RFID or machine readable codes, such as barcodes or QR codes, which can be read by a mobile or stationary reader 714, such as a barcode scanner, QR code scanner, RFID reader, or other compatible signal reader via wireless communication 710. The flexible tag 712 may also be printed with human readable text for visual readability 702.

The present invention is a communication system for asset identification, tracking and management supporting the processing of communications between a home network in a local network system, and between a home network and one or more mobile foreign networks wherein the communication system utilizes flexible active radio beacons positioned in flexible tags for asset identification, tracking and management. The communication system may include one or more wireless networks, computer servers, databases, base stations, and antennas that can be individually configured for specific locales and readable ranges for tagged asset groups. Assets that are tagged with the Flex Tags can be identified through a variety of means, including wireless communication with a mobile device, such as a laptop computer, tablet commuter, smart mobile or other mobile device with RF reading capabilities, and data received from the active radio beacons can be communicated to the home network.

The radio beacon in the flexible tag utilizes one or more wireless personal area network (WPAN), wireless local area network (WLAN) or wireless wide area network (WWAN) radio frequency communication standards at the physical layer. The radio beacon can utilize standards-based radio frequency communication and non-standards based radio frequency communication. Standards-based radio frequency communication can be one or more of Bluetooth, LoRa, Wireless USB, WiFi, Ultra-Wide Band (UWB), and ZigBee. The radio beacon may use one or more of the Bluetooth standards, including Bluetooth Low Energy (BLE). System connectivity may be accomplished via various types of networks, including, but not limited to, Wireless Personal Area Networks (WPAN), Wireless Local Area Networks (WLAN) and Wireless Wide Area Networks (WWAN). The radio frequency communication may also be accomplished by using a non-standards-based methodology. This non-standards-based communication may be in various parts of the spectrum such as the Industrial, Medical and Scientific bands or various licensed bands as needed. This flexibility of communication standards and communication frequencies allows for diverse use cases.

The flexible tags can also have RFID and/or machine-readable codes that can be read by scanners or readers, including dedicated reading devices and mobile devices having compatible applications enabled to read the codes. These devices can transmit data to other system components, such as computer servers and controllers for asset management. The flexible tags can also have human readable text printed on the tags to enable visual identification of the assets in addition to electronic identification.

Figure 8:
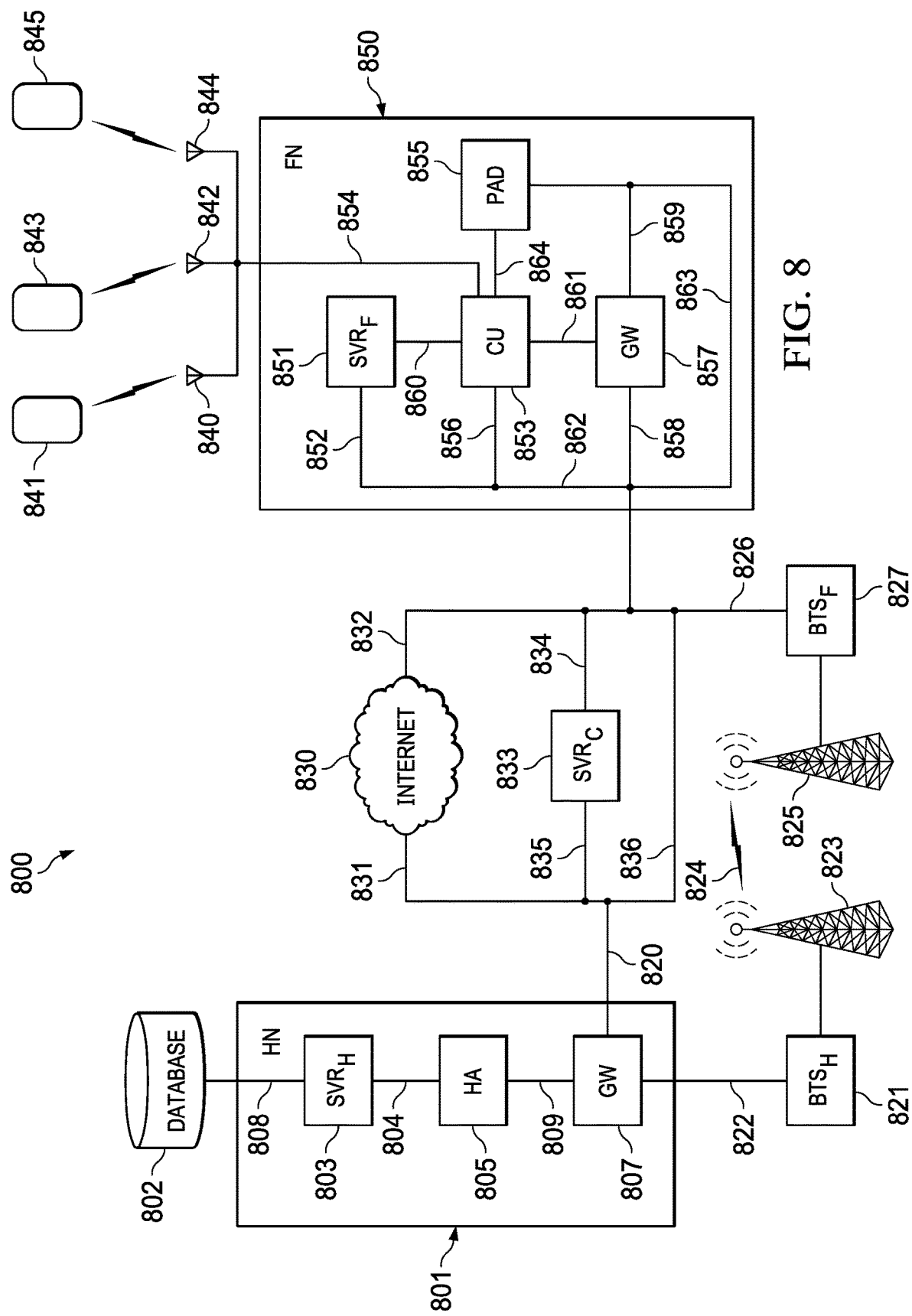
FIG. 8 shows one communications network according to the present invention.

FIG. 8 is a block diagram of one embodiment of the present invention showing a communication system supporting the processing communications between a home network 801 and one or more mobile foreign networks 850, where the home network 801 has a home agent 805 coupled to a home network computer server(h) (SVR(h)) 803 by line 804. The home network computer server(h) 803 is coupled to a database memory 802. While only one database 802 is shown, this representation is understood to include one or more separate databases and storage locations of data and information. A communications link or line is any connection between two or more nodes on a network or users on networks or administrative domains, including serial lines, parallel lines, and bus lines for electronic signal transmission.

The database 802 may maintain information related to asset management and tracking, and the home network server computer(h) 803 processes instructions and data to operate the enterprise asset management and tracking software for the system. The invention contemplates centrally located computer servers to operate the software modules and database information on the network, but remotely located servers and computer networks can also be accessed and used with the invention.

The home agent 805 on the home network 801 is coupled to a gateway 807 by line 809, and the gateway 807 facilitates communicates to and from the home network 801. The gateway 807 is coupled to a base station transceiver BTS(h) 821 via line 822, which is coupled to a radio transmission unit and antenna 823 via line 829. That radio transmission unit and antenna 823 facilitates communications to other radio transmission units 825. The transmission unit 823 supports radio transmission communications links (e.g. Wi-Fi, cellular, GSM, Evdo, 4G/LTE, CDMA, or others), to other networks and communication units.

The home network gateway 807 is also coupled via line 820 to hardwire communication line 836, communications computer server(c) (SVR(c)) 833 via line 835, and the Internet 830 via line 831. The home network processes communications to and from mobile foreign networks, and information related to the external devices and beacons (e.g. location, proximity, status) can be included in communications to the home network. The home network can communicate via wireless transmission or a wired communication link to the mobile node, the Internet, other computer servers or other foreign or associated home networks.

As also shown in FIG. 8, active radio beacons 841, 843, and 845 are electronically coupled to Radio Frequency readers 840, 842 and 844, respectively. Radio Frequency readers 840, 842 and 844 are coupled to the controller unit CU 853 via line 854, which is coupled to foreign computer server(f) (SVR(f)) 851 via line 860, digital device 855 via line 864, and foreign network gateway 857 via line 861. Digital devices include devices such as, a computer, tablet computer, pad computer, laptop computer, mobile phone, handheld mobile device, or a dedicated radio frequency receiving device.

The controller unit CU 853, computer server(f) 851, digital device 855, and foreign network gateway 857 are coupled to the Internet 830 via lines 832 and 856, lines 832 and 852, lines 832 and 863, and lines 832 and 858 respectively. The controller unit CU 853, computer server(f) 851, digital device 855, and foreign network gateway 857 are coupled to the computer server(c) 833 via lines 834 and 856, lines 834 and 852, lines 834 and 863, and lines 834 and 858 respectively. The controller unit CU 853, computer server(f) 851, digital device 855, and foreign network gateway 857 are coupled to the home network 801 by a hardwire communication link via lines 820, 836, and 856; lines 820, 836, and 852; lines 820, 836, and 863; and lines 820, 836, and 858, respectively. And, controller unit CU 853, computer server(f) 851, digital device 855, and foreign network gateway 857 are coupled to the base-station transceiver unit(f) (BTS(f)) 827 (coupled to transmission unit and antenna 825) via lines 826 and 856, lines 826 and 852, lines 826 and 863, and lines 826 and 858 respectively.

Figure 9:
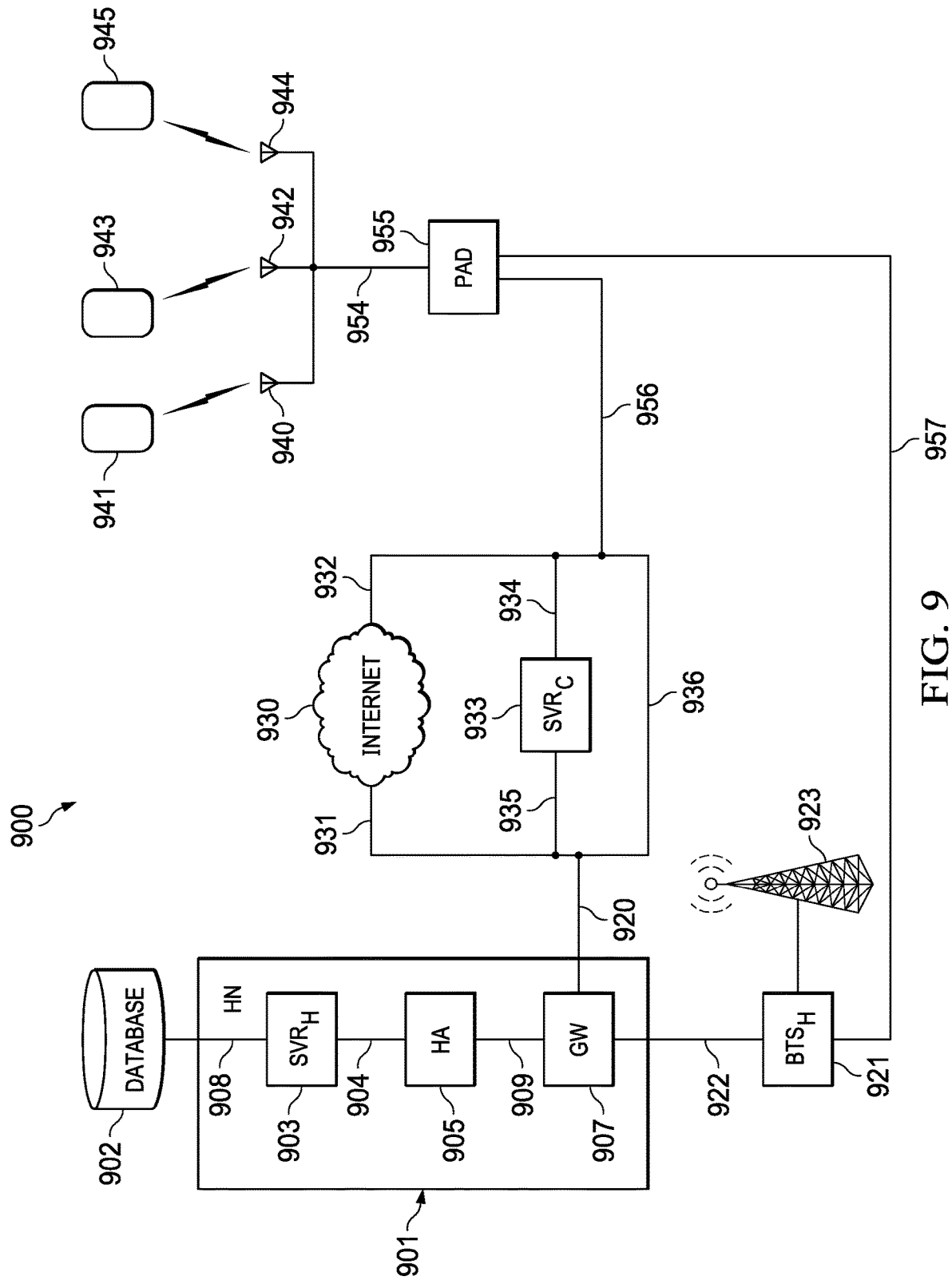
FIG. 9 shows another communications network according to the present invention.

FIG. 9 is a block diagram of another embodiment of the present invention showing a communication system supporting the processing communications between a home network 901 and one or more radio frequency receiving devices (computer, tablet computer, pad computer, laptop computer, mobile phone, handheld mobile device, or a dedicated radio frequency receiving device) 956, where the home network 901 has a home agent 905 coupled to a home network computer server(h) (SVR(h)) 903 by line 904. The home network computer server(h) 903 is coupled to a database memory 902. While only one database 902 is shown, this representation is understood to include one or more separate databases and storage locations of data and information. A communications link or line is any connection between two or more nodes on a network or users on networks or administrative domains, including serial lines, parallel lines and bus lines for electronic signal transmission.

The database 902 may maintain information related asset management and tracking, and the home network server computer(h) 903 processes instructions and data to operate the enterprise asset management and tracking software for the system. The invention contemplates centrally located computer servers to operate the software modules and database information on the network, but remotely located servers and computer networks can also be accessed and used with the invention.

The home agent 905 on the home network 901 is coupled to a gateway 907 by line 909, and the gateway 907 facilitates communicates to and from the home network 901. The gateway 907 is coupled to a base station transceiver BTS(h) 921 via line 922, which is coupled to a radio transmission unit and antenna 923 via line 929. That radio transmission unit and antenna 923 facilitates communications to other radio transmission units 925. The transmission unit 923 supports radio transmission communications links (e.g. Wi-Fi, cellular, GSM, Evdo, 4G/LTE, CDMA, or others), to other networks and communication units.

The home network gateway 907 is also coupled via line 920 to hardwire communication line 936, communications computer server(c) (SVR(c)) 933 via line 935, and the Internet 930 via line 931. The home network processes communications to and from mobile foreign networks, and information related to the external devices and beacons (e.g. location, proximity, status) can be included in communications to the home network. The home network can communicate via wireless transmission or a wired communication link to the mobile node, the Internet, other computer servers or other foreign or associated home networks.

As also shown in FIG. 9, active radio beacons 941, 943 and 945 are electronically coupled to radio frequency readers 940, 942 and 944, respectively. Radio frequency readers 940, 942 and 944 are part of the digital device 955 via line 954.

The digital device 955 is coupled to the Internet 930 via lines 956. The digital device 955 is coupled to the Internet 930 via lines 956. The RF receiver digital device 955 is coupled to the base-station transceiver unit(h) (BTS(h)) 921 via lines 957.

EXAMPLES

The following examples represent only a few of the possible uses envisioned for the Flexible Radio Beacons and Flexible Delivery Structures of the present invention. These examples are not the only uses of the invention nor is the introduction of these examples intended to in any way limit uses of the invention.

Warehouse ID and Tracking System

The radio beacon instantiated as a radio frequency device and associated circuitry on a flexible printed circuit board is attached to a battery and inserted into a sandwiched paper label system. These paper labels are attached to pallets in a warehouse for tracking by barcode or QR reader, RFID reader and radio frequency beacon.

The paper labels with the unit are part of a roll of labels that go into a printer. An individual unit is dormant, with no battery usage, by virtue of a fusible switch or link between the battery and the radio beacon. The flexible unit also contains RFID encoding, decoding. The label is printed with machine readable codes such as barcodes or QR codes as well as human readable text and numbers. The unit is activated when it goes through an RFID enabled printer and the label is printed and the RFID encoding performed. The power of the RFID encoding signal fuses the link and activates the device.

The printing and activation also transfer identification information to the flexible unit, through the antenna and decoder for use in optional use in transmission by the flexible radio beacon. Thus, the beacon broadcast sends flex unit IDs, RFIDs, barcode and any other information desired. This allows barcode, RFID and radio beacon ID to all be set on demand at time of use and sent to a backend system for synchronization. In this scenario, the passive RFID portion of the system will continue to work when the battery is exhausted.

With an active radio beacon now broadcasting ID information, inventory levels and locations can be tracked.

The above-described embodiments of the present application are intended to be examples only. Those of skill in the art may effect alterations, modifications and variations to the particular embodiments without departing from the scope of the application. In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

The invention claimed is:

1. A flexible radio frequency (RF) tag comprising:
a beacon layer with an integrated transmitter and power source having an active radio beacon constructed on a flexible printed circuit board, said radio beacon is configured to transmit radio frequency signals, said radio beacon remaining dormant until activated and said radio beacon has data storage and programming capabilities after activation wherein encoding is reported to the tag for storage and broadcast;
one or more antennas for receiving and transmitting said radio frequency signals;
a switch coupled to the radio beacon that is activated by an electronic signal and having a decoder that receives and decodes an activation signal;
a battery attached adjacent to the flexible printed circuit board and coupled to the switch, said battery being the power source for the tag;
a semi-flexible top layer printable with machine readable code, human readable text, or combinations thereof, said semi-flexible top layer coupled to said beacon layer; and
said tag is configured to be in communication with one or more computing device external to and in wireless communication with the tag for tracking an asset associated with said tag.

2. The flexible radio frequency tag of claim 1 further comprising:
one or more Radio Frequency Identification (RFID) tags connected adjacent to the flexible printed circuit board in the beacon layer.

3. The flexible radio frequency tag of claim 1 wherein the integrated transmitter and power source in the beacon layer is activated physically by physical pressing force from an automated device, said pressing force actuates the switch to activate the radio beacon and the battery.

4. The flexible radio frequency tag of claim 1 wherein the integrated transmitter and power source in the beacon layer is activated electronically by an encoding signal from an encoding device.

5. The flexible radio frequency tag of claim 1 further comprising:
a bottom layer underlying and affixed to the beacon layer, said bottom layer providing protection, water resistance and/or adhesion for said tag.

6. The flexible radio frequency tag of claim 1 further comprising:
one or more layers of surrounding material around one or more edges of the beacon layer, said surrounding material providing support, protection and/or adhesion for said tag.

7. The flexible radio frequency tag of claim 1 wherein the tag is encased in a flexible moisture resistant coating or a non-flexible container.

8. The flexible radio frequency tag of claim 2 wherein an RFID identification is reportable through the radio beacon and a radio beacon identification is reportable through an RFID reader.

9. The flexible radio frequency tag of claim 1 wherein tracking, identification, and status data broadcast by said tag is stored in a cloud storage.

10. The flexible radio frequency tag of claim 1 wherein the radio beacon transmits and receives radio frequency signals.

11. The flexible radio frequency tag of claim 1 wherein the radio beacon uses standards-based radio frequency communication.

12. A communication system supporting processing of communications between a physically flexible radio frequency (RF) tag and a home computer network for asset tracking comprising:
a first computer server on a home network, said first computer server having one or more hardware data processors with functionality to receive and process tracking, identification and status information signals relating to one or more trackable assets, said first computer server coupled to a first database for storing and maintaining information relating to said trackable assets and said first computer server being coupled to a home agent and a first gateway server for communication outside the home network;
one or more flexible radio frequency (RF) tags associated with said one or more trackable asset, said tag having a beacon layer with an integrated transmitter and a power source having
an active radio beacon constructed on a flexible printed circuit board, said radio beacon is configured to transmit radio frequency signals, said radio beacon remaining dormant until activated and said radio beacon has data storage and programming capabilities after activation wherein encoding is reported to the tag for storage and broadcast;
one or more antennas for receiving and transmitting said radio frequency signals;
a switch coupled to the radio beacon that is activated by an electronic signal and having a decoder that receives and decodes an activation signal;
a battery attached adjacent to the flexible printed circuit board and coupled to the switch, said battery being the power source for the tag;
said flexible RF tag has a pressure activation device that manually actuates the switch by application of a physical pressing force, a decoder that electronically actuates the switch by receipt of an external radio activation signal to one of said one or more antennas, or a combination thereof; and
one or more semi-flexible layers providing support, protection and/or adhesion affixed to a top surface, a bottom surface, or around one or more edges of the beacon layer, at least one of which is a semi-flexible top layer printable with machine readable code, human readable text, or combinations thereof, said semi-flexible top layer is affixed to said top surface of said beacon layer;
said flexible RF tag is configured to be in communication with one or more computing devices external to and in wireless communication with the tag for tracking an asset associated with said tag;
one or more radio frequency receiving devices having application programing to receive radio frequency signals from the tag, said radio frequency receiving device receives signals transmitted from said tag, and said radio frequency receiving device relays data received from the tag to the first computer server.

13. The communication system of claim 12 wherein the radio frequency receiving device is a computer, tablet computer, pad computer, laptop computer, mobile phone, handheld mobile device, or a dedicated radio frequency receiving device.

14. The communication system of claim 12 wherein said one or more flexible radio frequency (RF) tags further comprises one or more RFID tags connected adjacent the active radio beacon.

15. The communication system of claim 12 further comprising:
a base-station transceiver unit coupled to the home network that can receive transmissions from one or more said tags.

16. The communication system of claim 12 further comprising:
a second computer server on a foreign network, said second computer server being coupled to said radio frequency receiving device, said radio frequency receiving device being coupled to a second gateway server for communication outside the foreign network and said radio frequency receiving device receives radio signals transmitted from one or more RF tags, each of said one or more RF tags being associated with one of said one or more trackable asset and said radio frequency receiving device using said radio signals to transmit tracking, identification and status information signals that are communicated to the first computer server on the home network.

17. The communication system according to claim 12 wherein the integrated transmitter and power source in the beacon layer is activated physically by physical pressing force from the pressure activation device, electronically by the external radio activation signal received by one of said one or more antennas, or electronically by an encoding signal from an RFID encoding device, such as an RFID printer.

18. The communication system according to claim 12 wherein the RF tag transmission utilizes one or more wireless personal area network (WPAN), wireless local area network (WLAN) or wireless wide area network (WWAN) radio frequency communication standards at a physical layer.

19. A method of transmitting communications between a physically flexible radio frequency (RF) tag and a home computer network for asset tracking comprising the steps of:
   providing a first computer server on a home network, said first computer server coupled to a first database and a first gateway, said first computer server having one or more hardware data processors;
   supporting communications to and from the home network using said first gateway server;
   providing one or more flexible radio frequency (RF) tags associated with one or more trackable assets, said tag having
      a beacon layer with an integrated transmitter and power source having an active radio beacon constructed on a flexible printed circuit board, said radio beacon is configured to transmit radio frequency signals, said radio beacon remaining dormant until activated and said radio beacon has data storage and programming capabilities after activation wherein encoding is reported to the tag for storage and broadcast;
      one or more antennas for receiving and transmitting said radio frequency signals;
      a switch coupled to the radio beacon that is activated by an electronic signal and having a decoder that receives and decodes an activation signal;
      a battery attached adjacent to the flexible printed circuit board and coupled to the switch, said battery being the power source for the tag;
      a pressure activation device that manually actuates the switch by application of a physical pressing force, a decoder that electronically actuates the switch by receipt of an external radio activation signal to one of said one or more antenna, or a combination thereof; and
      one or more semi-flexible layers providing support, protection and/or adhesion affixed to a top surface, a bottom surface, or around one or more edges of the beacon layer, at least one of which is a semi-flexible top layer printable with machine readable code, human readable text, or combinations thereof, said semi-flexible top layer is affixed to said top surface of said beacon layer;
   said tag is configured to be in communication with one or more computing devices external to and in wireless communication with the tag for tracking an asset associated with said tag;
   providing a radio frequency receiver device that has application programming to receive transmissions from the beacon, said radio frequency receiving device is a computer, tablet computer, pad computer, laptop computer, mobile phone, handheld mobile device, or a dedicated radio frequency receiving device;
   receiving, by said radio frequency receiver device, radio frequency signals transmitted from the radio beacon;
   relaying transmissions received by the radio frequency receiver device to the first computer server; and
   storing received transmissions in said database.

20. The method of claim 19 wherein said one or more tags further comprises one or more RFID tag.

21. The method of claim 19 further comprising:
   providing a base-station transceiver unit coupled to the home network that can receive transmissions from said one or more tags.

22. The method of claim 19 further comprising:
   providing a second computer server on a foreign network, said second computer server being coupled to said radio frequency receiving device, said radio frequency receiving device being coupled to a second gateway server for communication outside the foreign network and said radio frequency receiving device receives radio signals transmitted from the tag, each of said one or more tags being associated with one of said one or more trackable assets and said radio frequency receiving device using said radio signal transmissions to transmit tracking, identification and status information signals that are communicated to the first computer server on the home network.

23. The method of claim 19 wherein the RF tag radio beacon transmission utilizes one or more wireless personal area network (WPAN), wireless local area network (WLAN) or wireless wide area network (WWAN) radio frequency communication standards at a physical layer.

* * * * *